(12) United States Patent
Raphael et al.

(10) Patent No.: US 11,504,978 B2
(45) Date of Patent: Nov. 22, 2022

(54) AGNOSTIC IN-LINE VERIFICATION SYSTEM FOR FINISHING RFID-ENABLED TAGS

(71) Applicant: AVERY DENNISON RETAIL INFORMATION SERVICES LLC, Mentor, OH (US)

(72) Inventors: George T. Raphael, High Point, NC (US); Peter Cockerell, Milton Keynes (GB); Donald Ward, Sayre, PA (US); Joshua Blauvelt, Erin, NY (US); Timothy Entingh, Waverly, NY (US); Jason Wheeler, Sayre, PA (US); Augustine Diciacce, Waverly, NY (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/726,199

(22) Filed: Dec. 23, 2019

(65) Prior Publication Data
US 2020/0207116 A1 Jul. 2, 2020

Related U.S. Application Data

(60) Provisional application No. 62/783,586, filed on Dec. 21, 2018.

(51) Int. Cl.
*B41J 3/407* (2006.01)
*B41J 11/70* (2006.01)
*G06K 19/077* (2006.01)

(52) U.S. Cl.
CPC ........... *B41J 3/4075* (2013.01); *B41J 11/703* (2013.01); *G06K 19/0776* (2013.01)

(58) Field of Classification Search
CPC .... B41J 3/4075; B41J 11/703; G06K 19/0776
See application file for complete search history.

(56) References Cited

U.S. PATENT DOCUMENTS

| 6,593,853 B1 | 7/2003 | Barrett et al. |
|---|---|---|
| 7,073,712 B2 | 7/2006 | Jusas et al. |

(Continued)

FOREIGN PATENT DOCUMENTS

| CN | 101782608 | 7/2012 |
|---|---|---|
| CN | 102831492 | 12/2012 |

(Continued)

OTHER PUBLICATIONS

International Preliminary Reporton Patentability dated Jun. 16, 2021 issued in corresponding IA No. PCT/US2019/068442 filed Dec. 23, 2019.

(Continued)

*Primary Examiner* — David H Banh

(57) ABSTRACT

An agnostic in-line verification system and method produce finished RFID-enabled tags including labels, tags, tickets, stickers and the like. Includes is an RFID-verification base unit with an RFID-verifier that checks for verification of programmed data of the RFID-enabled tags. A feed module is positioned upstream of the RFID-verification base to receive a flow of RFID-enabled tags to be finished through RFID verification, and a collector module is downstream of the RFID-verification base unit and that receives RFID-verified tags from the RFID-verification base unit. In systems that feed a continuous stream of uncut tags, a cutter module is positioned between the verification base unit and the collector module.

21 Claims, 23 Drawing Sheets

(56) References Cited

U.S. PATENT DOCUMENTS

| | | |
|---|---|---|
| 7,114,654 B2 | 10/2006 | Chapman et al. |
| 7,164,353 B2 | 1/2007 | Puleston et al. |
| 7,174,284 B2 | 2/2007 | Dolansky et al. |
| 7,301,458 B2 | 11/2007 | Carrender et al. |
| 7,359,823 B2 | 4/2008 | Forster |
| 2007/0096874 A1 | 5/2007 | Mravca |
| 2008/0125994 A1 | 5/2008 | Schiebout |
| 2009/0159191 A1* | 6/2009 | Grimes ............ G06K 19/07718 156/249 |
| 2009/0307529 A1* | 12/2009 | Kim ...................... G06K 1/121 714/37 |
| 2010/0245058 A1* | 9/2010 | Kojima ................... B41J 29/46 340/10.52 |
| 2011/0298609 A1* | 12/2011 | Mekid ................... G01M 3/005 340/539.1 |
| 2013/0161382 A1* | 6/2013 | Bauer ................ G06K 17/0025 235/375 |
| 2013/0213995 A1* | 8/2013 | Horel ..................... A47K 10/44 221/197 |
| 2015/0008259 A1* | 1/2015 | Jang ...................... G06Q 50/28 235/385 |
| 2017/0169262 A1* | 6/2017 | Kowata .................... G06K 5/00 |
| 2018/0276432 A1* | 9/2018 | Manickam ............ G06K 1/121 |
| 2019/0272497 A1* | 9/2019 | Tingler .................. G07G 1/009 |

FOREIGN PATENT DOCUMENTS

| | | |
|---|---|---|
| CN | 202848138 U | 4/2013 |
| CN | 107490982 | 12/2017 |
| EP | 3093797 | 11/2016 |
| EP | 3128465 | 2/2017 |
| JP | 5501912 | 3/2014 |
| JP | 6151628 | 6/2017 |
| JP | 6310685 | 3/2018 |
| WO | 2009/047190 | 4/2009 |

OTHER PUBLICATIONS

International Search Report and Written Opinion dated Apr. 20, 2020 issued in corresponding IA No. PCT/US2019/068442 filed Dec. 23, 2019.

* cited by examiner

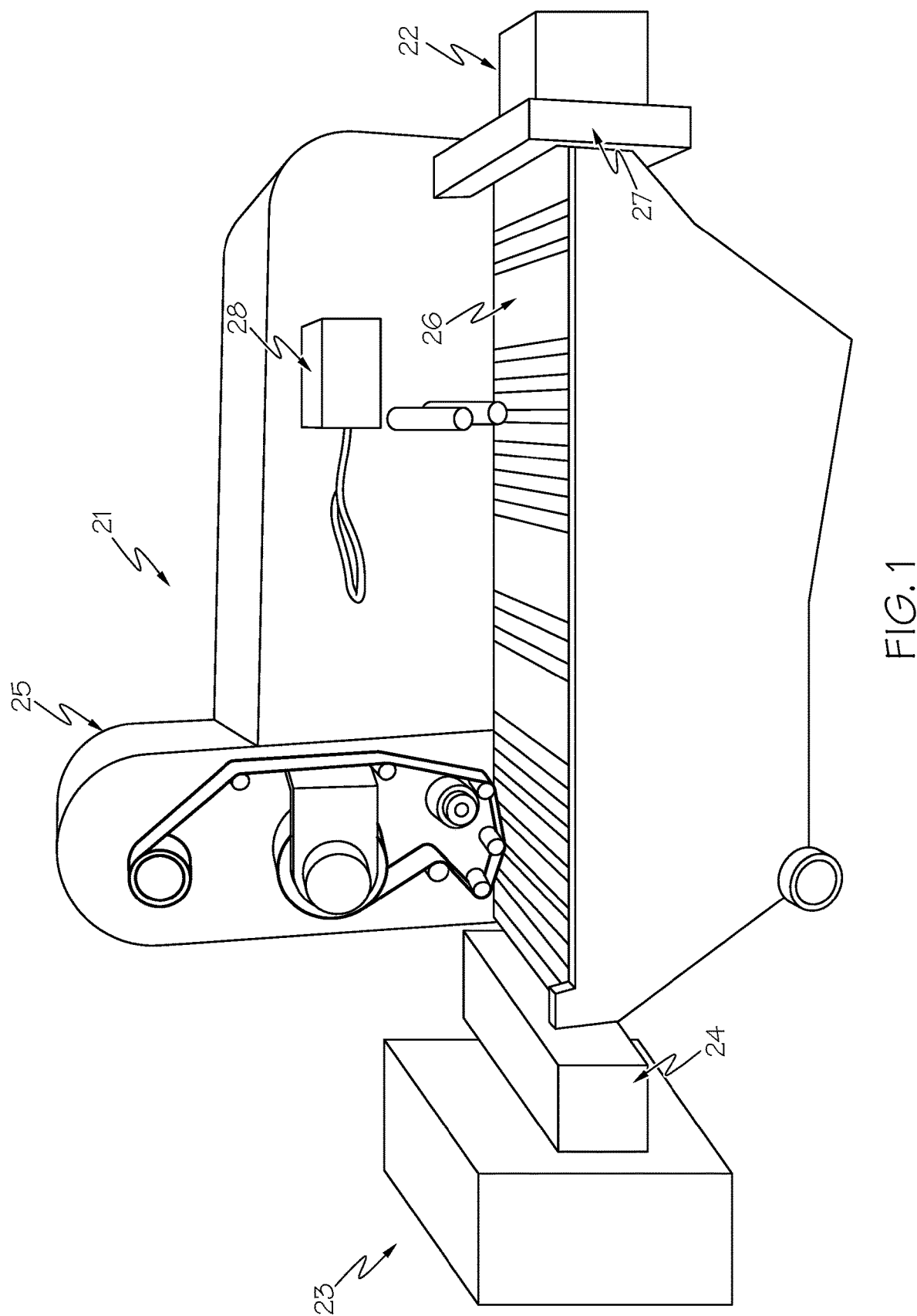

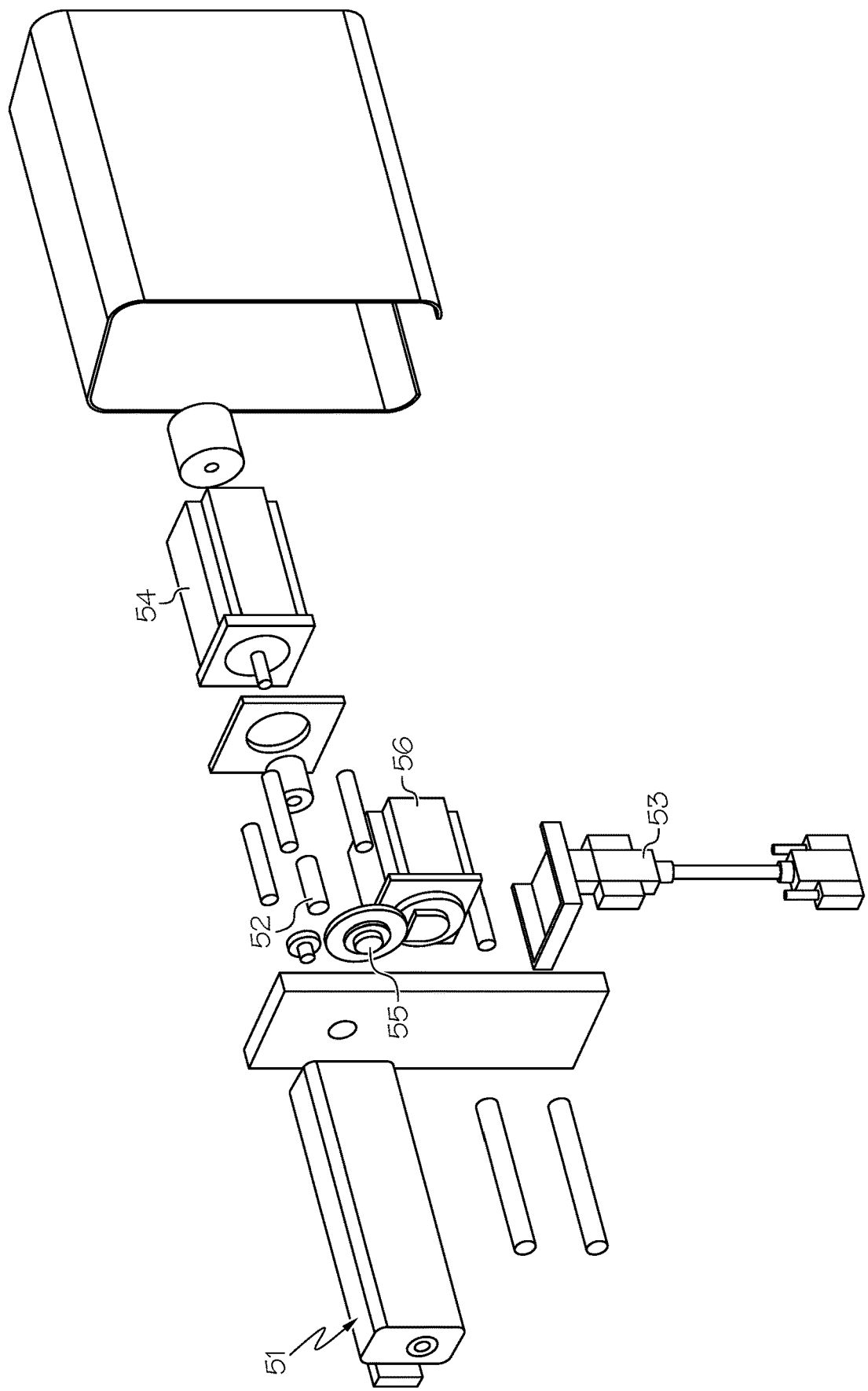

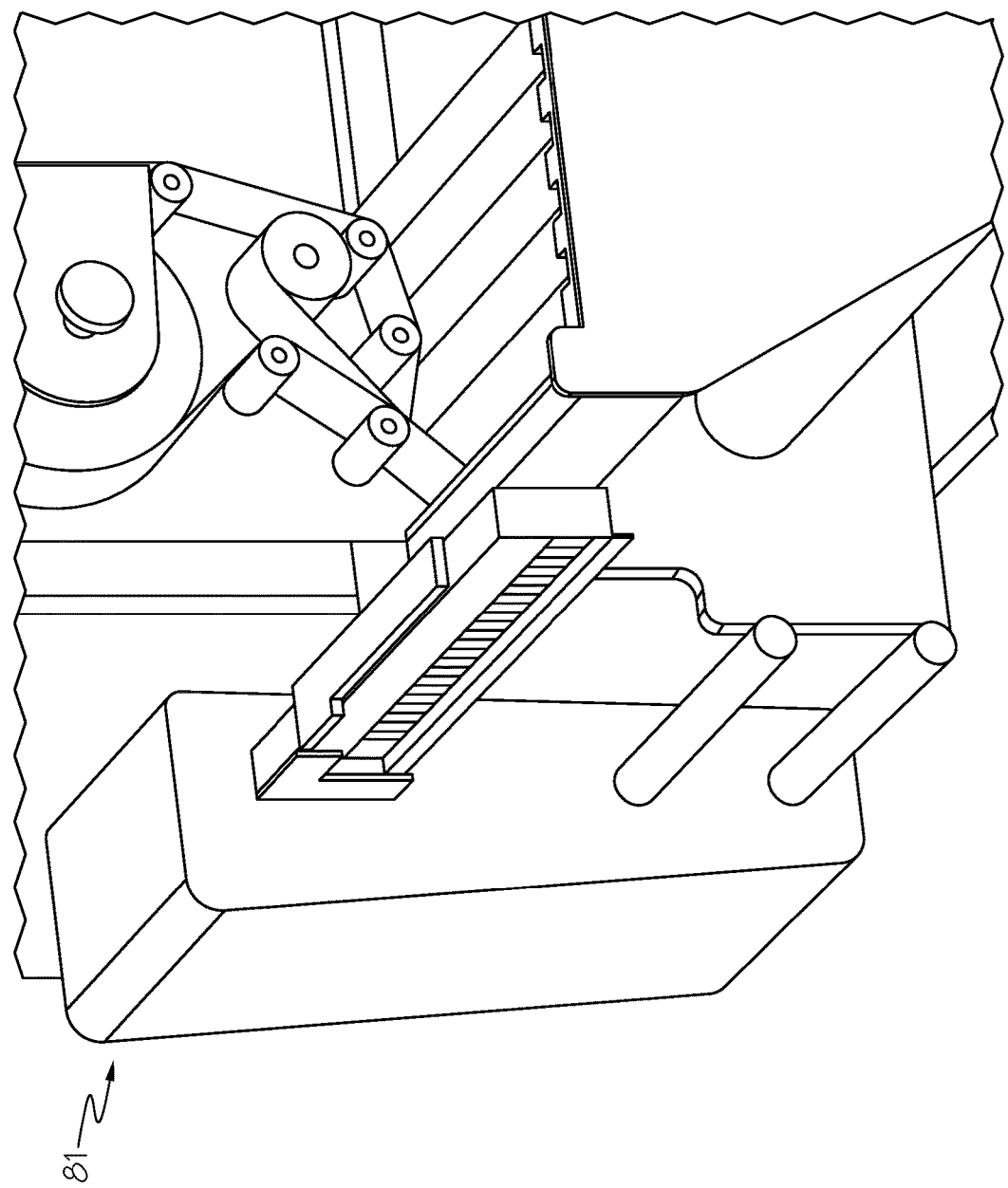

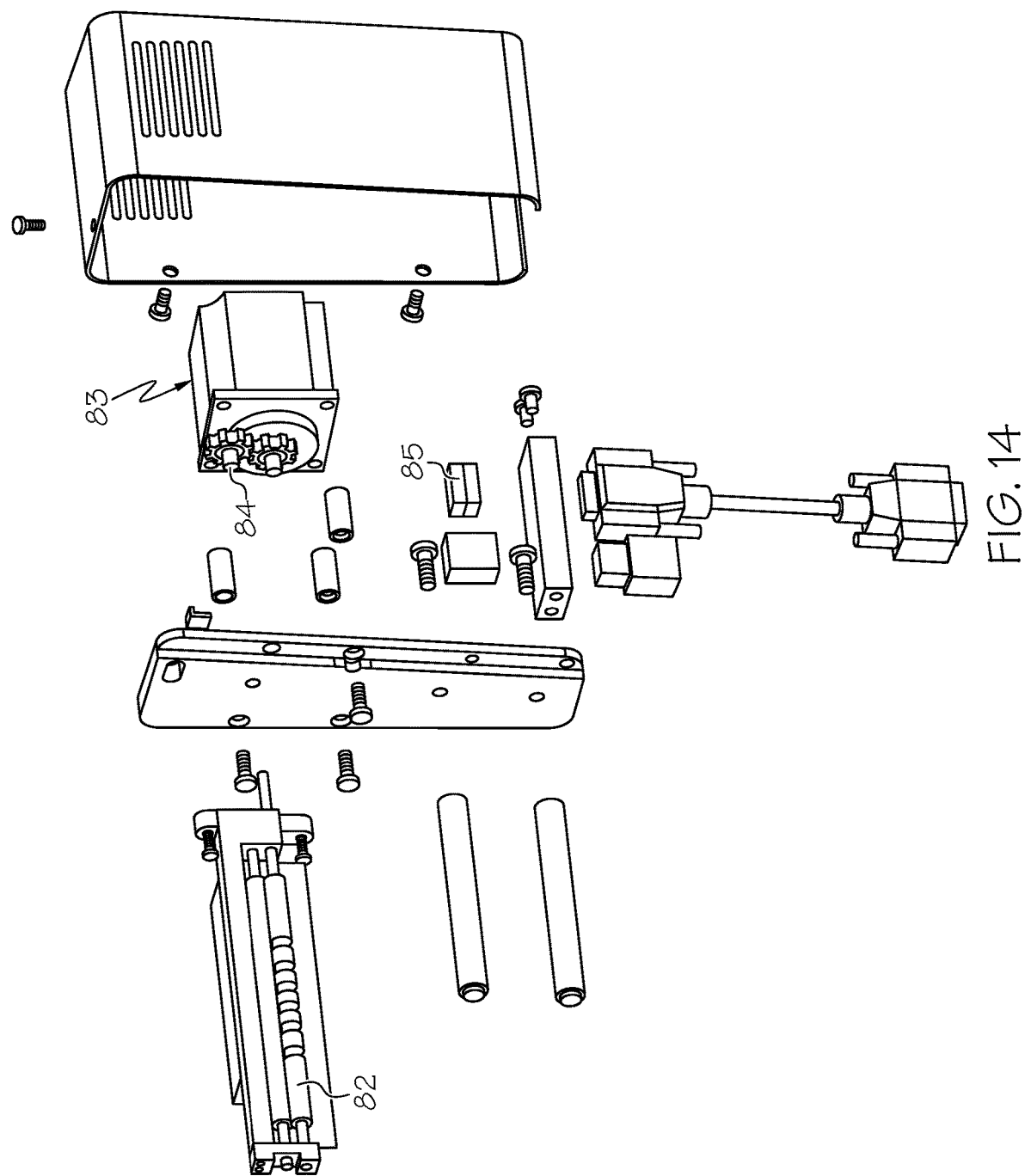

AGNOSTIC IN-LINE VERIFICATION SYSTEM FOR FINISHING RFID-ENABLED TAGS

CROSS REFERENCE TO RELATED APPLICATION(S)

The present application claims priority to and the benefit of United States provisional utility patent application No. 62/783,586 filed Dec. 21, 2018, which is incorporated herein by reference in its entirety.

BACKGROUND

Field of the Disclosure

The present subject matter relates to the finishing of RFID-enabled tags. More particularly, the present subject matter relates to an agnostic in-line verification system to produce finished RFID-enabled tags, including labels, tags, tickets, stickers and the like.

Description of Related Art

Printing devices, such as thermal printers and ink-jet printers, are used to generate printed material, and such printed material can include RFID-enabled tags. Typical RFID-enabled tags include labels, tags, tickets, stickers and the like, at times referred to herein as "RFID-enabled tags." RFID-enabled tags can be provided in a cut sheet, on a roll or otherwise provided in discrete units or pieces (e.g., individual tags or labels), then the printed material must be cut to size. Some printing devices include a built-in cutter, which cuts the substrate to size after print has been applied to the substrate. While built-in cutters may provide adequate functionality, they may also result in various disadvantages when maintenance is required. For example, if the substrate becomes caught or jammed in the cutter while passing through the printing device or if the cutter otherwise becomes inoperative, then the cutter must be accessed to correct the error. Accordingly, some printing devices employed in the RFID-enabled tags production industry prepare uncut rolls of tags.

RFID-enabled tags can include indicia to assist in tracking each tag in accordance with encoder programs of the RFID-enabled tag inlays, supported by software applications. In these instances, an RFID-verifier can be employed to check the programmed data for each RFID-enabled tag such as by using a separate antenna and reader module. Each RFID-enabled tag can be read, checked and verified. If the verification procedure does not result in confirmation of the programmed data (e.g. EPC—electronic product code) for that tag, that tag can be designated as out of compliance, for example by being so designated by a bad-label marking applicator.

SUMMARY

There are several aspects of the present subject matter, which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

When the printed materials having RFID-enabled tags are prepared, global compliance initiatives can require processing the RFID-enabled tags by what can be considered as finishing of the RFID-enabled tags. The present subject matter, in operations of this type, accomplishes finishing that produces finished RFID-enabled and RFID-verified tags, which can be labels, tags, tickets, stickers and the like by way of an agnostic in-line verification system and method that include a base unit and modules that can be employed in various combinations so as to achieve finishing of a variety of RFID-enabled tags.

In one aspect, an agnostic in-line verification system and method are provided to produce finished RFID-enabled tags including labels, tags, tickets, stickers and the like, the system including an RFID-verification base unit that includes an RFID-verifier that reads and checks for verification of programmed data of the RFID-enabled tags, a feed module upstream of the RFID-verification base that receives from a source of RFID-enabled tags a flow of RFID-enabled tags, either in a singulated or in continuous format to be finished through RFID verification, and a collector module downstream of the RFID-verification base unit and that receives RFID-verified tags from the RFID-verification base unit.

In another aspect, there is provided an agnostic in-line verification system and method to produce finished RFID-enabled tags including labels, tags, tickets, stickers and the like, the system including an RFID-verification base unit that includes an RFID-verifier that reads the tags and then checks for verification of programmed data of the RFID-enabled tags, a feed module upstream of the RFID-verification base that receives from a source of RFID-enabled tags a flow of RFID-enabled tags to be finished through RFID verification, and a cutter module is positioned in-line and downstream of the RFID-verification base unit and upstream of a collector module downstream of the RFID-verification base unit and that receives RFID-verified tags from the RFID-verification base unit. The collection unit may also receive the defective tags, which have been marked to illustrate that the tags are not operable.

In a further aspect, agnostic in-line verification systems and methods are provided to produce finished RFID-enabled tags including labels, tags, tickets, stickers and the like, the system including an RFID-verification base unit that includes an RFID-verifier that reads and checks for verification of programmed data of the RFID-enabled tags, a feed module upstream of the RFID-verification base that receives from a source of RFID-enabled tags a flow of RFID-enabled tags to be finished through RFID verification, and a cutter module that is a rotary cutter, a linear cutter, die cutter or a double cutter is positioned downstream of the RFID-verification base unit and upstream of a collector module downstream of the RFID-verification base unit and that receives RFID-verified tags from the RFID-verification base unit.

In an additional aspect, there is provided an agnostic in-line verification system and method to produce finished RFID-enabled tags including labels, tags, tickets, stickers and the like, the system including an RFID-verification base unit that includes a reader for reading identification indicia of the RFID-enabled tags that combines with an RFID-verifier that checks for verification of programmed data of the RFID-enabled tags, as well as a bad-label marking applicator, a feed module upstream of the RFID-verification base that receives from a source of RFID-enabled tags a flow of RFID-enabled tags to be finished through RFID verification, and a cutter module is positioned in-line and downstream of the RFID-verification base unit and upstream of a collector module downstream of the RFID-verification base unit and that receives RFID-verified tags from the RFID-verification base unit.

In another aspect, an agnostic in-line verification system and method are provided in instances where users employ a personal computer or other computing device to download information to a printer that delivers tags to the agnostic in-line verification system to produce finished RFID-enabled tags, the agnostic system including an RFID-verification base unit that includes an RFID-verifier that reads and checks for verification of programmed data of the RFID-enabled tags, a feed module upstream of the RFID-verification base that receives from a source of RFID-enabled tags a flow of RFID-enabled tags to be finished through RFID verification, and a collector module downstream of the RFID-verification base unit and that receives RFID-verified tags from the RFID-verification base unit.

BRIEF DESCRIPTION OF THE DRAWINGS

FIG. 1 is a front perspective view of an RFID-verification base unit or machine of the agnostic in-line verification system;

FIG. 7A is an exploded perspective detail view of a rotary cutter unit embodiment;

FIG. 13A is a perspective detail view of FIG. 12, illustrating a cut single transfer nip module embodiment;

FIG. 14 is an exploded perspective view of a transfer nip module;

DESCRIPTION OF THE ILLUSTRATED EMBODIMENTS

Figure 2A:
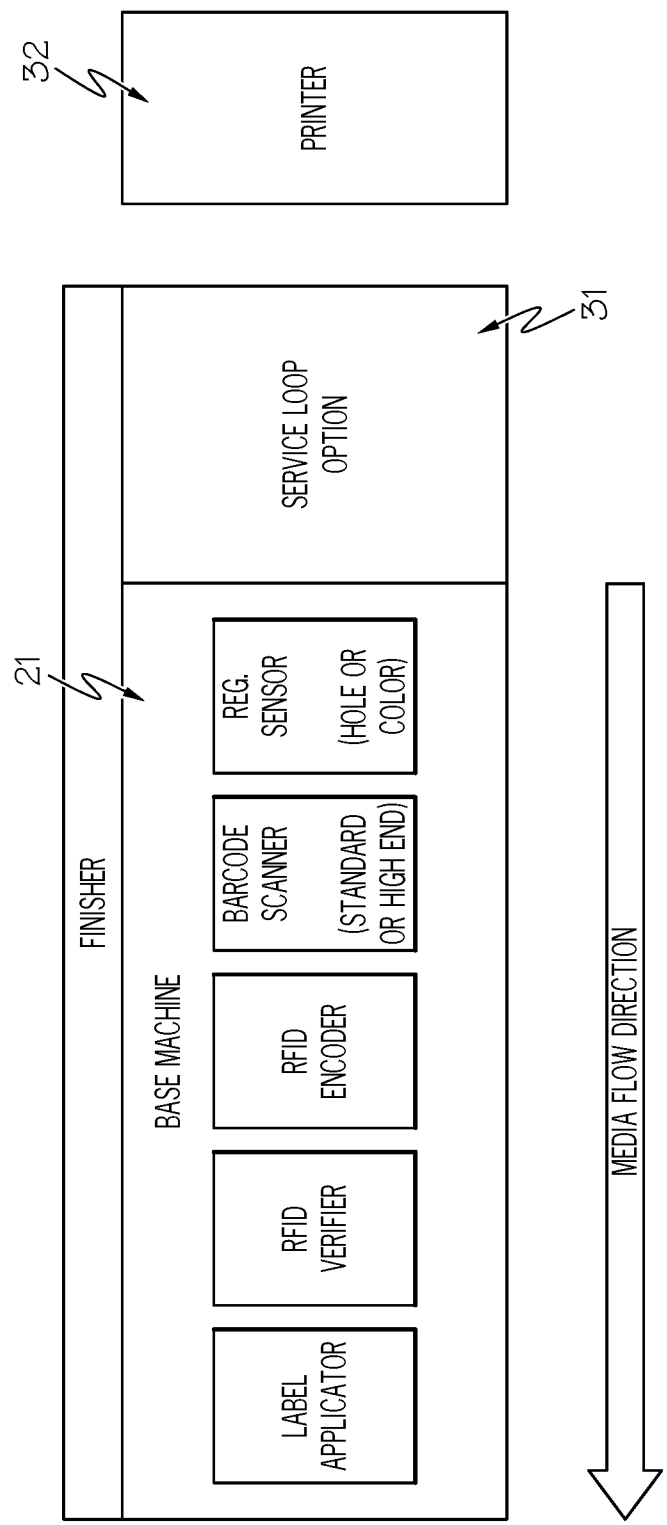
FIG. 2A is a schematic illustrating the RFID-verification base unit and certain features thereof in association with a feed module of the roll-to-roll or service loop type for receiving roll media from a printer.

As required, detailed embodiments of the present disclosure are described and shown herein; however, it is to be understood that the disclosed embodiments are merely exemplary and may be embodied in various forms. Therefore, specific details disclosed herein are not to be interpreted as limiting, but merely as a basis for the claims and as a representative basis for teaching one skilled in the art to variously employ the present disclosure in virtually any appropriate manner.

The agnostic in-line verification system and method is designed to finish RFID-enabled tags, such as tags having a pressure-sensitive adhesive allowing the tags to be affixed to consumer goods, packaging and the like. This includes reading each individual tag, encoding the RFID inlay, verifying the RFID inlay, and designating, such as by marking (e.g. ink spot) or adding a label, any RFID tag that does not meet the verification criteria, thereby indicating that particular tag is not capable of being read and therefore is not acceptable and thus not usable for its intended purpose.

Tags of this type typically are printed or otherwise imaged, and the agnostic in-line verification system and method are advantageously used in conjunction with an external printer and/or an external unwinder to feed material into the verification unit, and the material can be in roll form, web form, or be a flow of tags that are pre-cut or otherwise ready for use upon verification by the subject verification system and/or method. The system is suitable to be used in connection with a personal computer or other data processing approach, which may be connected locally or to a remote data center, to download information to the printer, and when desired that information will include commands to deliver the tags to the in-line RFID-verification system. Agnostic in-line RFID-enabled tag verification systems of this type are sized and engineered to be suitable for table-top uses.

A. RFID-Verification Base Unit or Machine

An embodiment of the base unit or machine component of the agnostic in-line verification system and method is illustrated in FIG. 1, generally designated at 21. This can be considered as a flexible finisher for RFID tags and available from Avery Dennison Retail Information Services, LLC, Printer Systems Division 170 Monarch Lane, Miamisburg, Ohio 45342. Shown associated with this base unit are schematic representations of the agnostic options of an upstream feed module generally designated at 22, a downstream collector module 23 and, when appropriate for the particular agnostic system, a cutter module generally designated at 24 shown positioned between the base unit 21 and the collector module 23. The cutter module and collector module are engineered and programmed to be quickly mechanically secured to an adjoining unit and plugged into the base unit or machine 21 facilitating proper registry and function according to the in-line programming and operational parameters of the entire agnostic in-line verification system.

Also shown is a label applicator assembly, a known type being shown and designated generally at 25, which holds a roll of pre-cut pressure sensitive labels or stickers to be applied to tags processed by the agnostic system that are found by the system to be out of compliance, which can be referred to as "bad tags." When the barcode scanner or other reader or the RFID verifier detects or "sees" an out-of-compliance tag, the label applicator is triggered to place a sticker or other indicator on that particular out-of-compliance tag. Other marking systems could be incorporated; for example, an inkjet print station or other inker device that will work especially well with tag media compatible with inkjet marking. Essentially, when a tag is marked by whatever mechanism as "bad" the user will know to discard any tag so marked. The marking will be clearly legible to the operator making it easier for the operator to see and discard the unacceptable product.

Figure 15:
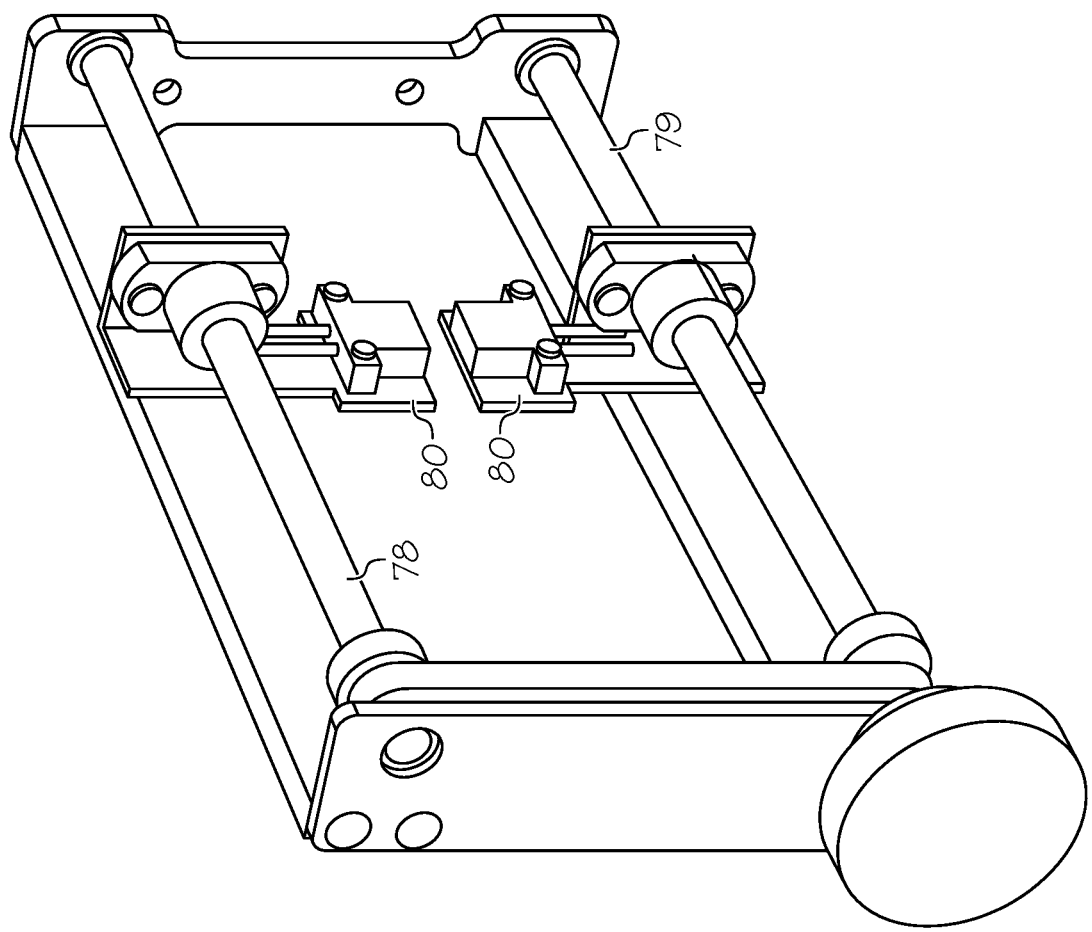
FIG. 15 is a perspective view of a registration sensor embodiment such as can be located at the in-feed end of the RFID-verification base unit or machine.

FIG. 1 further generally illustrates a conveyor at 26, which can be referred to as the main conveyor, along which tags flow for handling and processing along the base unit. In a typical set-up, the main conveyor is run at a continuous speed determined by the specific use to be performed by the system. A sensor generally designated at 27 is shown, positioned for sensing registration of tags flowing onto the conveyor. This registration sensor can sense holes in tags or tag substrates or supports, or can sense color information, for example, for assessing proper registration of tags as they flow. Activation of a knob 29 of the registration sensor assembly is available for traversing the sensor head across the web flow along the main conveyor 26. Further details of the registration sensor 27 are found in FIG. 15, including an upper sensor adjustment shaft 78, a lower sensor adjustment shaft 79 and upper and lower registration sensor units.

A scanner or reader generally designated at 28 is positioned above the conveyor; in embodiments this is a scanner for reading barcode types of indicia on the tags as they flow past on the conveyor. The scanner or reader captures and "reads" the barcode or other indicia or system and signal the RFID encoder what to encode onto that particular tag. If not properly read, the tag will not be properly encoded, and the tag will be marked defective or "bad" by the label applicator or other system. Reader systems other than barcode based are considered, including camera-recognition software. The illustrated scanner or reader 28 is mounted for traversing a path perpendicular to the movement direction of the main conveyor 26. The mount can also allow the scanner or reader to tilt.

Figure 12:
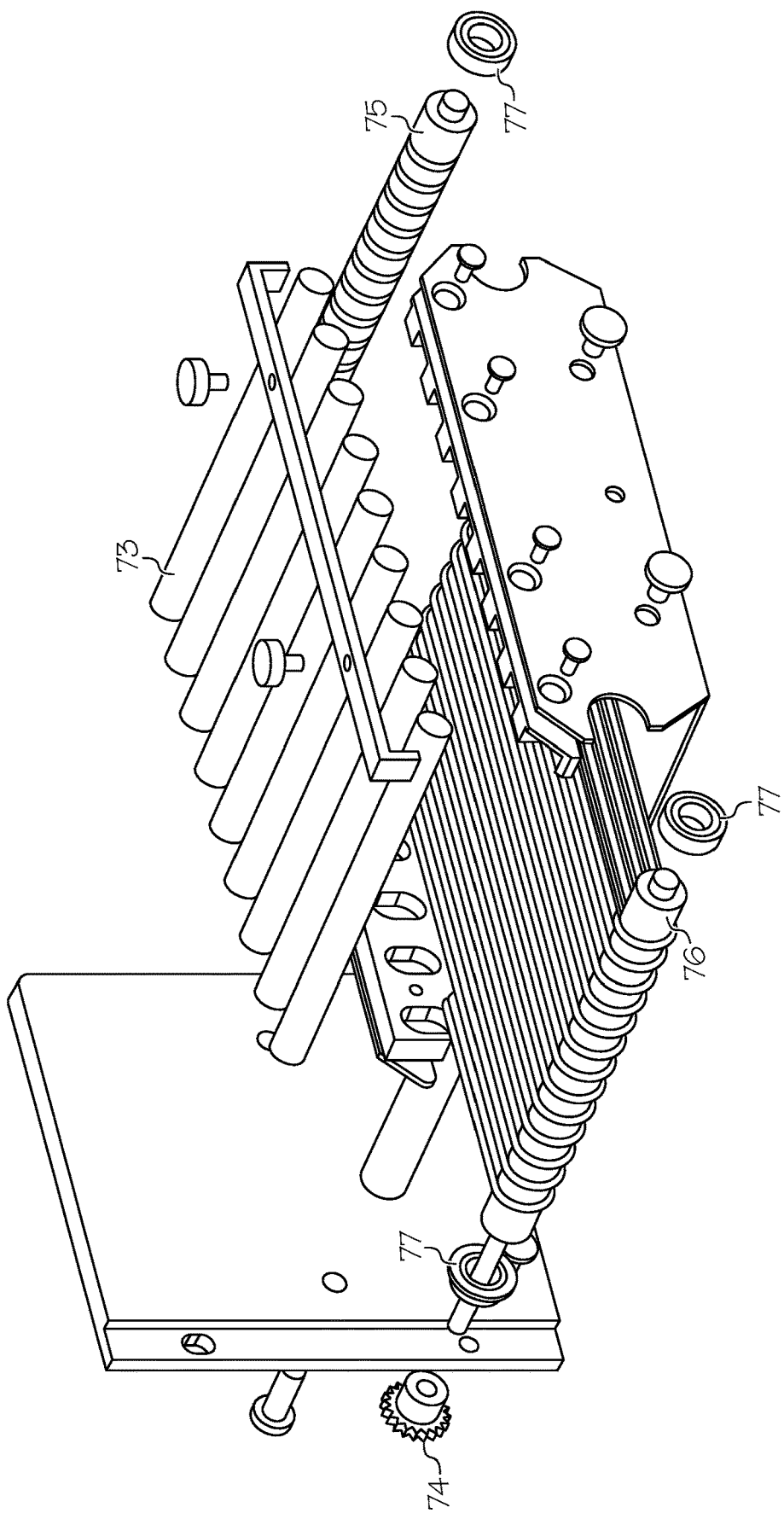
FIG. 12 is an exploded perspective view of an embodiment of a feed module of the sheet feed or auto feed type for receiving cut-single tags or sheets of tags from a printer.

The base unit and its associated agnostic in-line components produce finished RFID-enabled, RFID-verified tags. The base unit is part of a modular agnostic system and is structured and sized to accommodate multiple modules, particularly including options for and embodiments of feed modules 22, collector modules 23, cutter modules 24 (when needed), and nip assembly (when needed) and as generally shown in FIG. 12 and FIG. 12A. The feed module receives tags from a printing device of suitable type, including of the thermal printer type, laser type, ink-jet type, or other printing devices suitable for printing RFID-enabled tags. A data processing device or controller (e.g., a microprocessor) associated with the system or printer, for example a user's personal computer or other data processing either locally or at a remote location device can be provided with the capability to control the operation of the system. It should also be understood that the various units and modules and devices illustrated herein are merely exemplary and their respective details and configurations may vary without departing from the scope of the present disclosure.

Figure 2B:
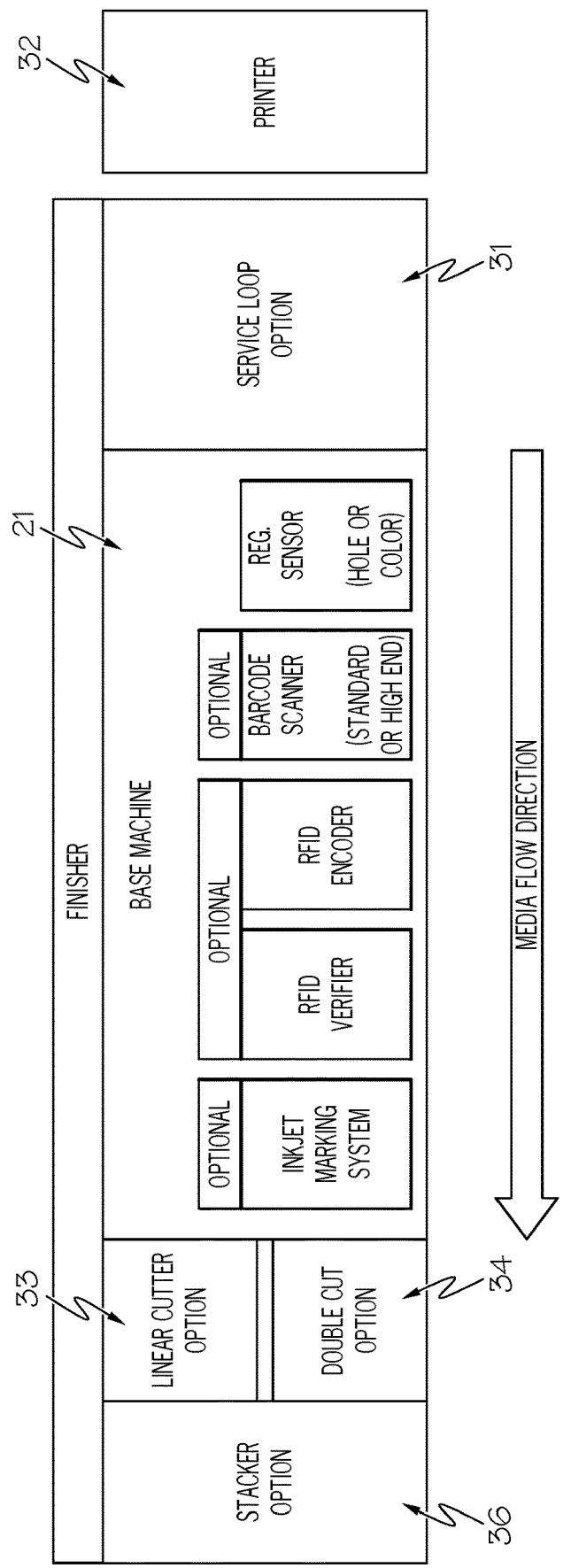
FIG. 2B is a schematic illustrating the RFID-verification base unit and certain features thereof in association with a feed module and printer as in FIG. 2A, further illustrating linear and double cutter and stacker options.
Figure 2C:
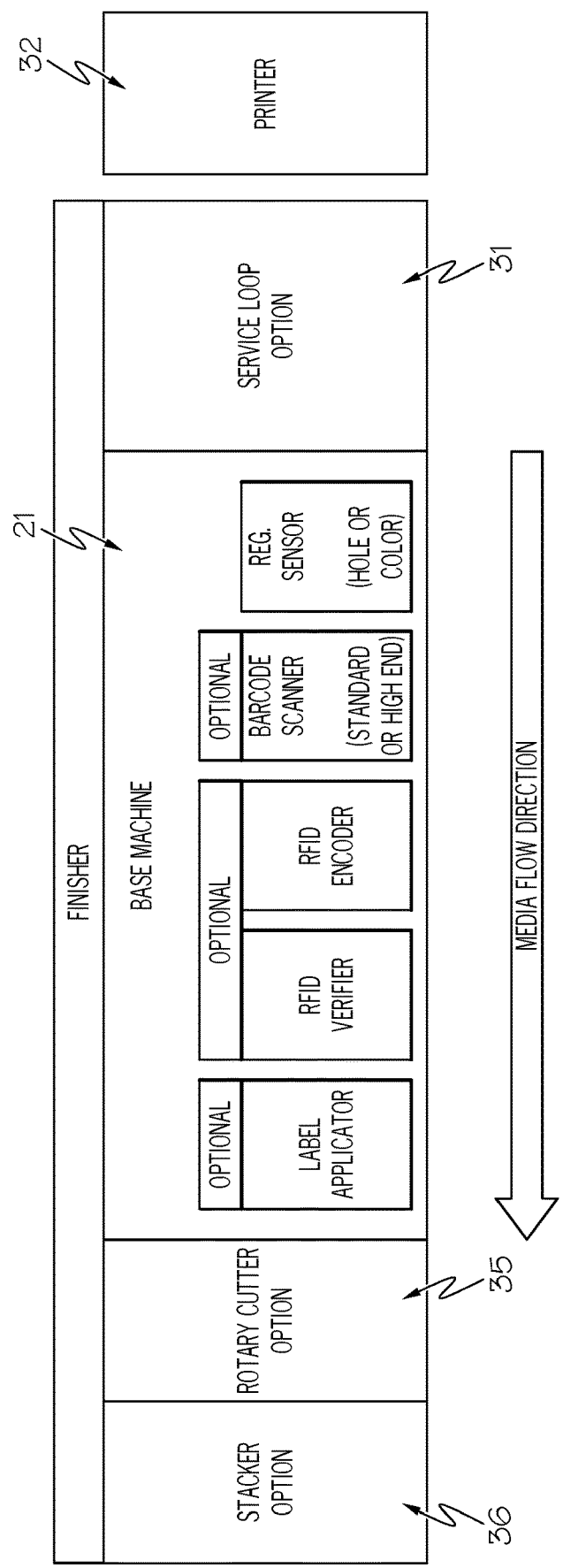
FIG. 2C is a schematic illustrating the RFID-verification base unit and certain features thereof in association with a feed module and printer as in FIG. 2A, further illustrating rotary cutter and stacker options.

The illustrated printing device 10 includes an enclosure or housing 12, which may be formed of any suitable material or materials (e.g., a generally rigid metal material and/or rigid plastic material). The housing 12 contains various components, which may include a supply of substrate material, a mechanism for applying print to the substrate material, and a mechanism for moving the substrate material through the interior of the housing 12 and out of the housing 12 via an opening 14, where it exits the printing device 10 as printed material. Further, the base unit or machine, as schematically illustrated in FIG. 2A, can have RFID verification and RFID encoding capabilities B. Feed Modules FIG. 2A, FIG. 2B and FIG. 2C schematically illustrate the addition of a feed module of the roll-to-roll or service loop type, generally designated at 31, for receiving roll media or webs of tags from a printing device generally designated at 32 directly or indirectly. The feed module can be configured to receive printed RFID-enabled tags in a direct feed from the printing device for verification and processing along the base unit or machine 21. In this embodiment of a feed module, the RFID-enabled tags can be in roll form or in web or continuous form, for example, and longitudinally spaced (and in some embodiments laterally spaced) along the unitary roll or web, allowing the in-tact web or roll to present the RFID-enabled tags to the analysis and action components of the base unit or machine. A dancer arm can be a component of the feed module 31, and the tag media can be automatically fed through the system, such as at a constant speed slightly faster than a direct feeding printer. When the dancer arm lowers, feed runs until the dancer arm reaches a predetermined height and waits for the printer to catch up by feedback though a service loop system. Such an approach can allow the printer to backup as much as it desires, even to a point where the media would be removed.

Figure 3A:
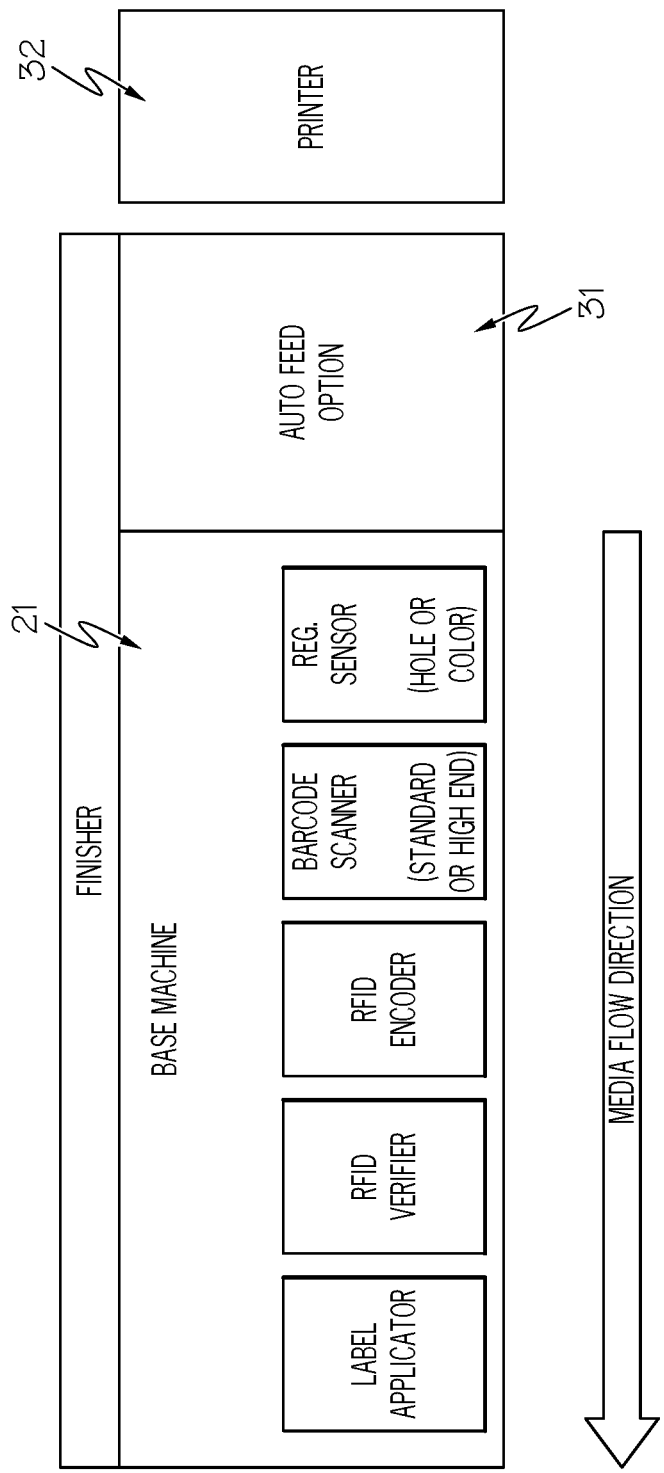
FIG. 3A is a schematic illustrating the RFID-verification base unit and certain features thereof in association with a feed module of the sheet feed or auto feed type for receiving cut-single tags or sheets of tags from a printer.
Figure 3B:
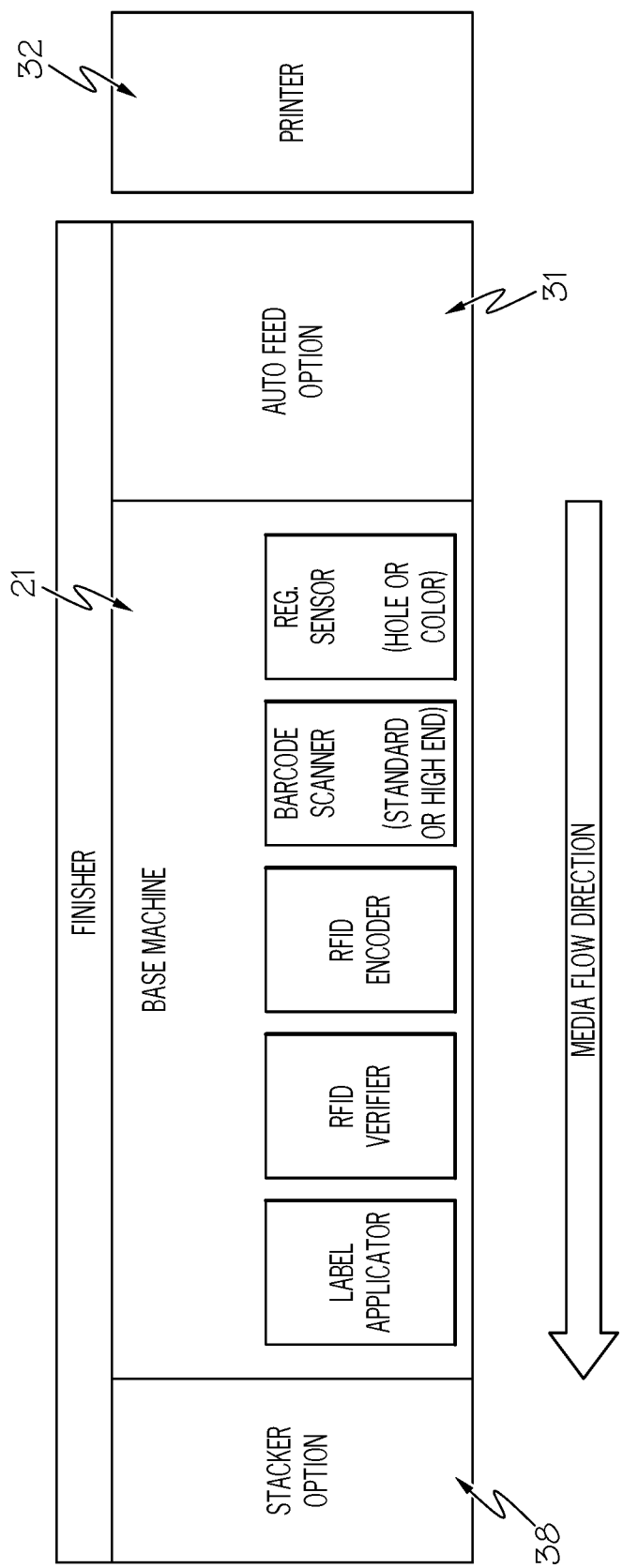
FIG. 3B is a schematic illustrating the RFID-verification base unit and certain features thereof in association with a feed module and printer as in FIG. 3A, further illustrating a stacker option.

When desired, the RFID-enabled tags can be separated from each other before exiting the agnostic system of the present disclosure, such as by inclusion of a mechanical cutter, sonic knife or other technology suitable for particular types of tags and systems. In this connection, reference is made, for example, to FIG. 2B, which adds a linear cutter module generally designated at 33 or a double-cut module generally designated at 34, and to FIG. 2C, which adds a rotary cutter module 35 downstream of the base unit or machine. A stacker module, generally designated at 36, can be provided downstream of the cutter module FIG. 3A and FIG. 3B schematically illustrate the positioning of a feed module of the sheet feed or auto feed type, generally designated at 37, for receiving cut-single tags or sheets of tags directly or indirectly from the printer 32. Inasmuch as the RFID-enabled tags of this version are pre-cut before entering the base unit or machine 21, a downstream cutter module can be omitted. A stacker module 36 embodiment of the collector module 23 can be provided downstream of the RFID-verification base unit or machine of the agnostic in-line verification system and can be either a vertical or horizontal stacker device.

In general, for any feed module or for other modules of these systems, each module may be of a bolt-on assembly structure, coupled with plug-in interface connections. Transition between some feed modules, such as the roll-to-roll versions, and the main conveyor 26 can be facilitated by a web guide assembly, such as the embodiment of same shown at 39.

C. Processing RFID-Enabled Tags Roll or Web Media

Figure 4:
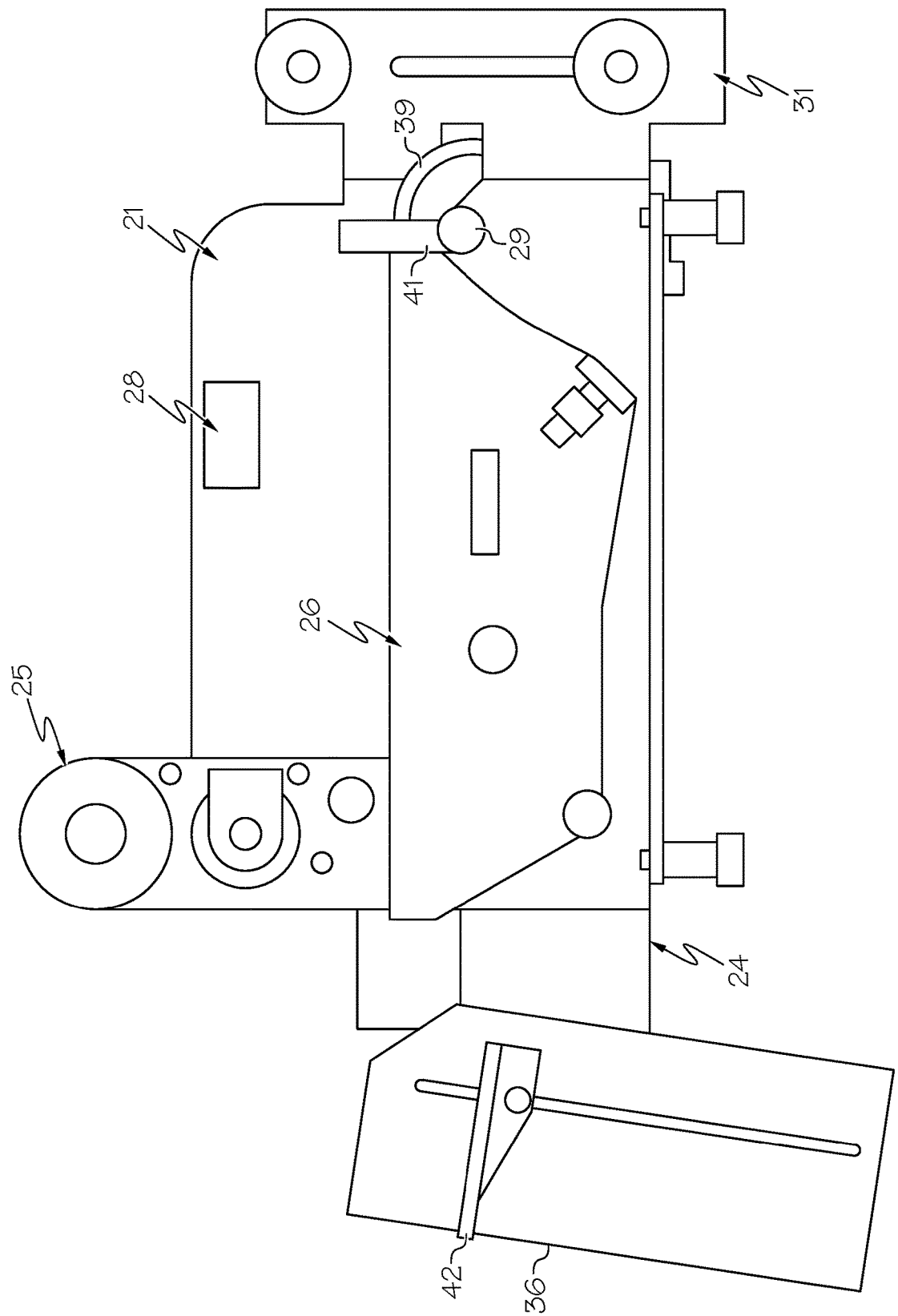
FIG. 4 is an elevation conceptual view of an arrangement of an agnostic in-line verification system of the type schematically illustrated in FIGS. 2B and 2C.

FIG. 4 somewhat conceptually presents an arrangement of an agnostic in-line verification system such as schematically shown in FIG. 2B and FIG. 2C that include a feed module of the roll-to-roll or service loop type, generally designated at 31, for receiving roll media or webs of tags from a printing device generally designated at 32 directly or indirectly and using a dancer arm. A registration sensor embodiment 41 of sensor 27 is located along an initial portion of the base unit or machine, for example at the feed end of the base unit or machine 21, at the feed end of main conveyor 26 or otherwise positioned downstream of the feed module 31 in this embodiment. The registration sensor 41 determines whether a specific tag is in proper relationship to the rest of the agnostic in-line verification system.

Figure 9:
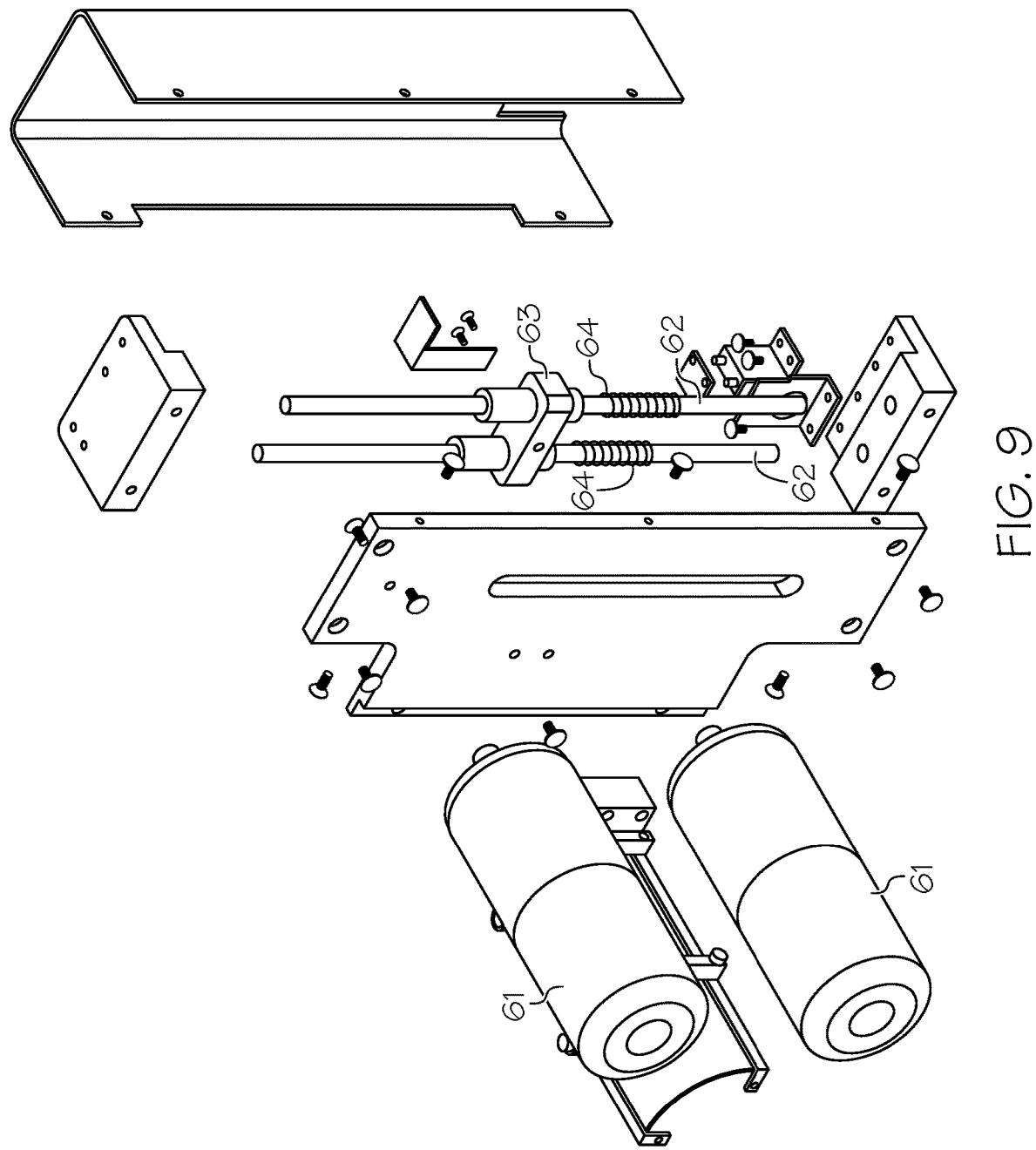
FIG. 9 is an exploded perspective view of an embodiment of a feed module of the roll-to-roll or service loop type for receiving roll media from a printer.

Positioned at the feed-end of the base unit or machine according to this embodiment for handling a roll media or web of RFID-enabled tags, each roll or web having multiple RFID-enabled tags. An exemplary embodiment of the roll-to-roll or service loop assembly module 31 with or without a dancer arm shown in this embodiment of the in-line verification system is illustrated in FIG. 9. Included in this illustration are two de-curler assemblies 61, linear guide shafts 62, a service loop dancer bracket 63, and service loop dancer stop springs 64.

This FIG. 4 embodiment includes the stacker module 36 that collects the finished, printed/encoded tags. The stacker module is adjustable to accommodate a variety of tag types and short or long tags or labels. In this embodiment, a stacker platform 42 moves downwardly as tags accumulate. When desired, a sensor will be tripped when the stacker is full to signal the agnostic in-line verification system to stop providing an opportunity to remove the stack of tags or labels from the stacker module.

Figure 5:
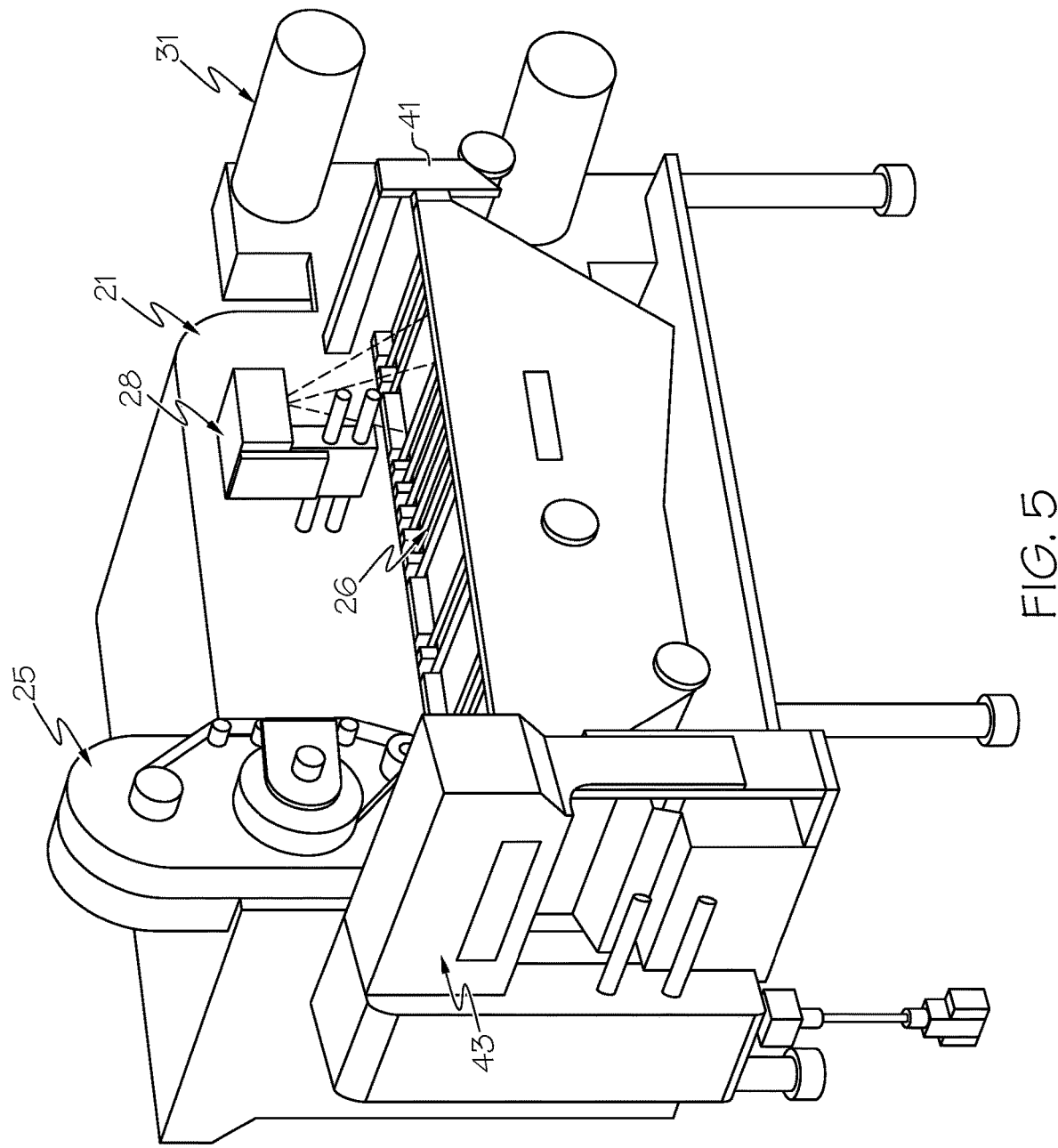
FIG. 5 is a front left perspective view of a unit as in FIG. 2B, with the stacker unit omitted, showing a linear cutter unit embodiment.
Figure 5A:
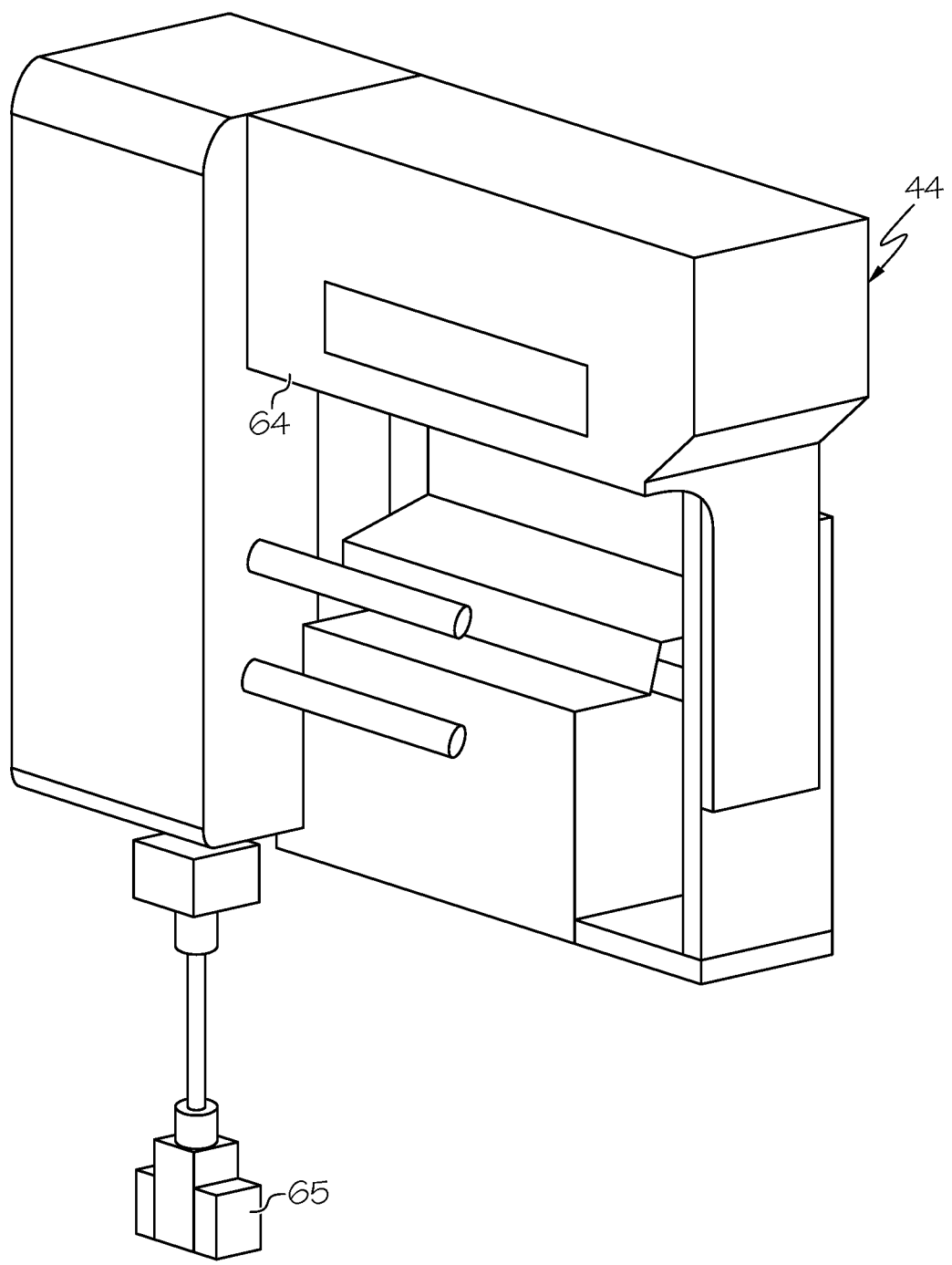
FIG. 5A is a perspective detail view of a linear cutter unit embodiment generally as in FIG. 5.

Examples of different cutter modules for this type of system include the following embodiments. FIG. 5 and FIG. 5A disclose a linear cutter embodiment generally designated at 43 and 44, respectively. Included are a stationary blade assembly and linear knife guard, a knife motor and spring extension, a rotary nip motor, a linear cutter assembly, a pivot rod and an encoder. In one embodiment of the linear cutter assembly, same achieves a cutting function that does not leave a "white line" or undesired mark on the cut edge. This embodiment can be especially useful for dark, flood-coated tags where a break in the coating can create a unintended marks.

Figure 6:
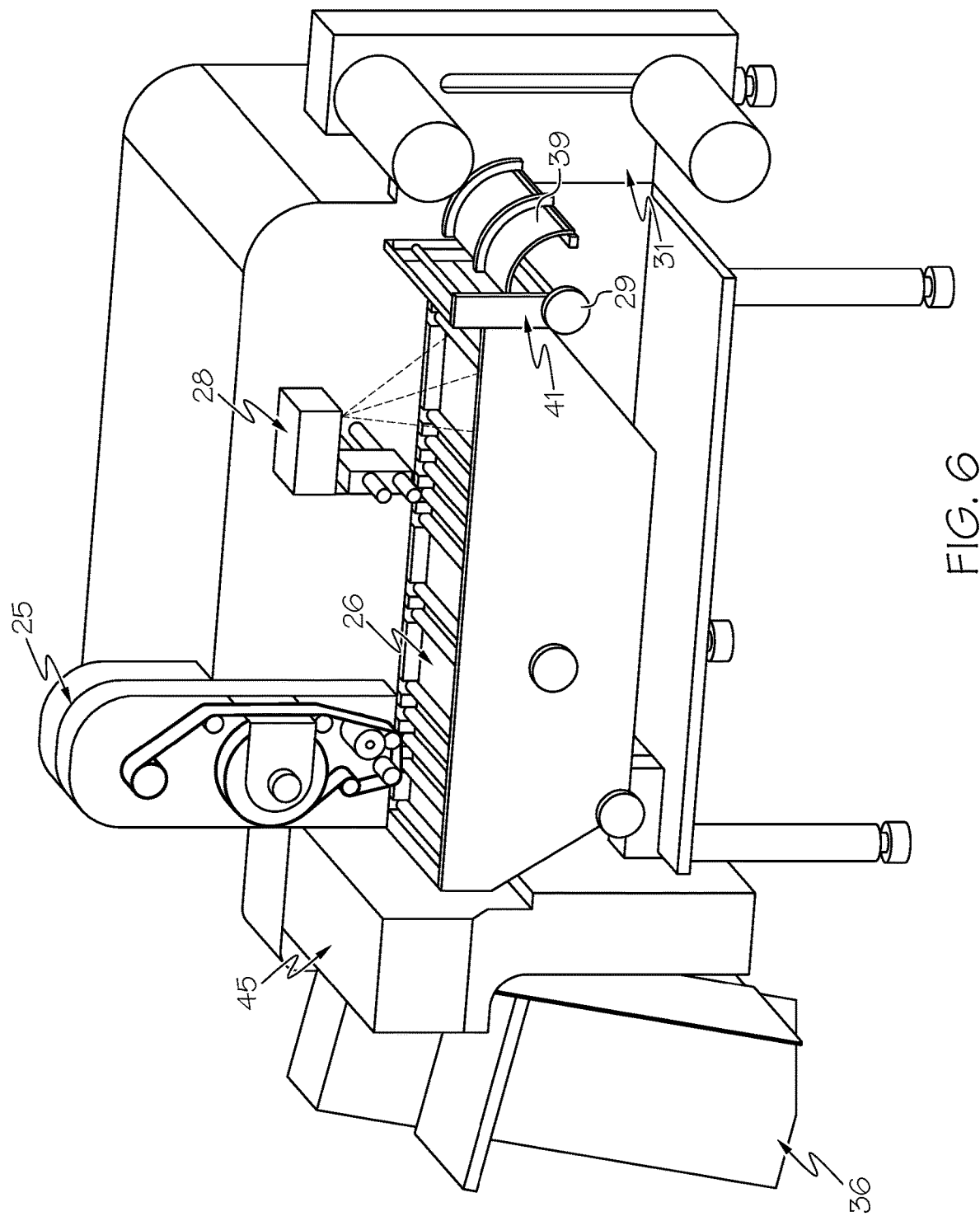
FIG. 6 is a front right perspective view of a unit as in FIG. 2B.

Another embodiment of the linear cutter assembly is a linear double cut module embodiment that achieves a double cut to remove material, e.g. "white space", or additional blank or substrate material, between tags printed on the roll or web. This embodiment can be especially useful for forming "rounded-corner" tags, for example, as well as for edge-to-edge color printing. The illustrated embodiment of this linear double-cut cutter module, generally depicted in FIG. 5A, includes a stationary blade 64, a linear knife, a linear knife motor, a finisher nip, a rotary nip motor 65, a linear cutter, pivot rod, carriage and shaft, and a cutter tensioning bar. FIG. 6 illustrates an agnostic system that includes a linear cutter embodiment 45 providing for either single cut or double cut cutting module.

Figure 7:
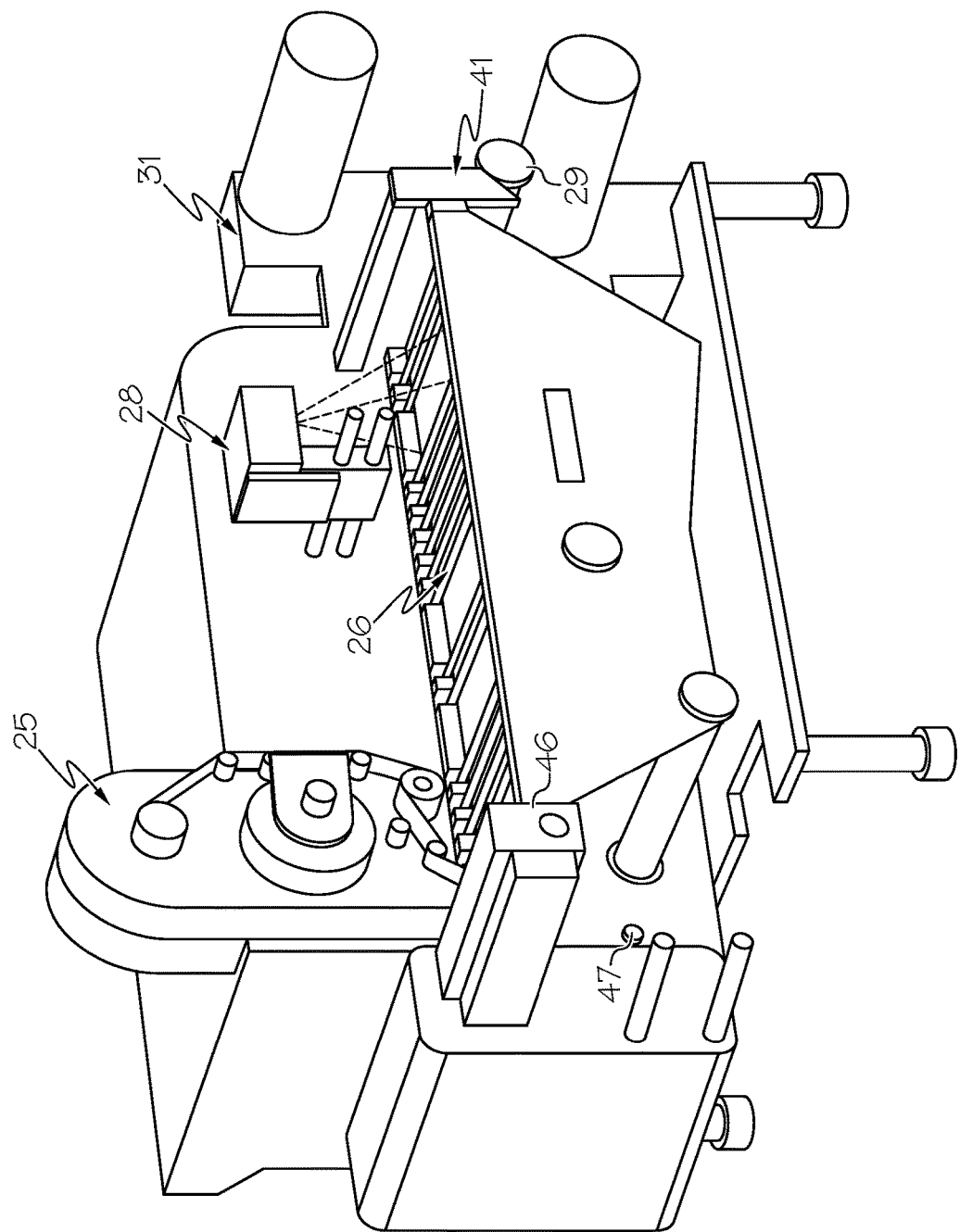
FIG. 7 is a front left perspective view of a unit as in FIG. 2C, with the stacker unit omitted, showing a rotary cutter unit embodiment.
Figure 7B:
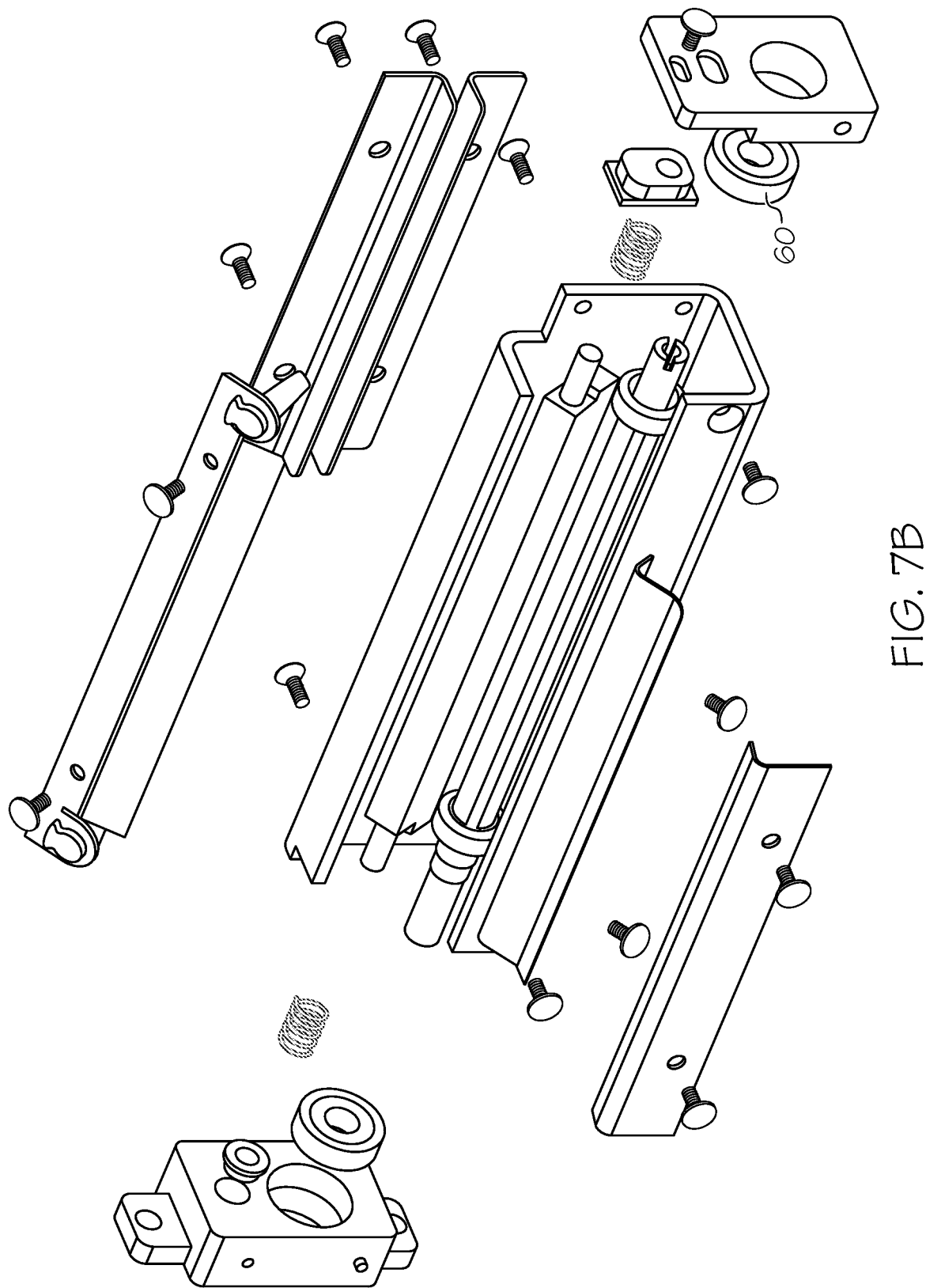
FIG. 7B is an exploded perspective detail view of a rotary knife assembly of a cutter unit embodiment.
Figure 8:
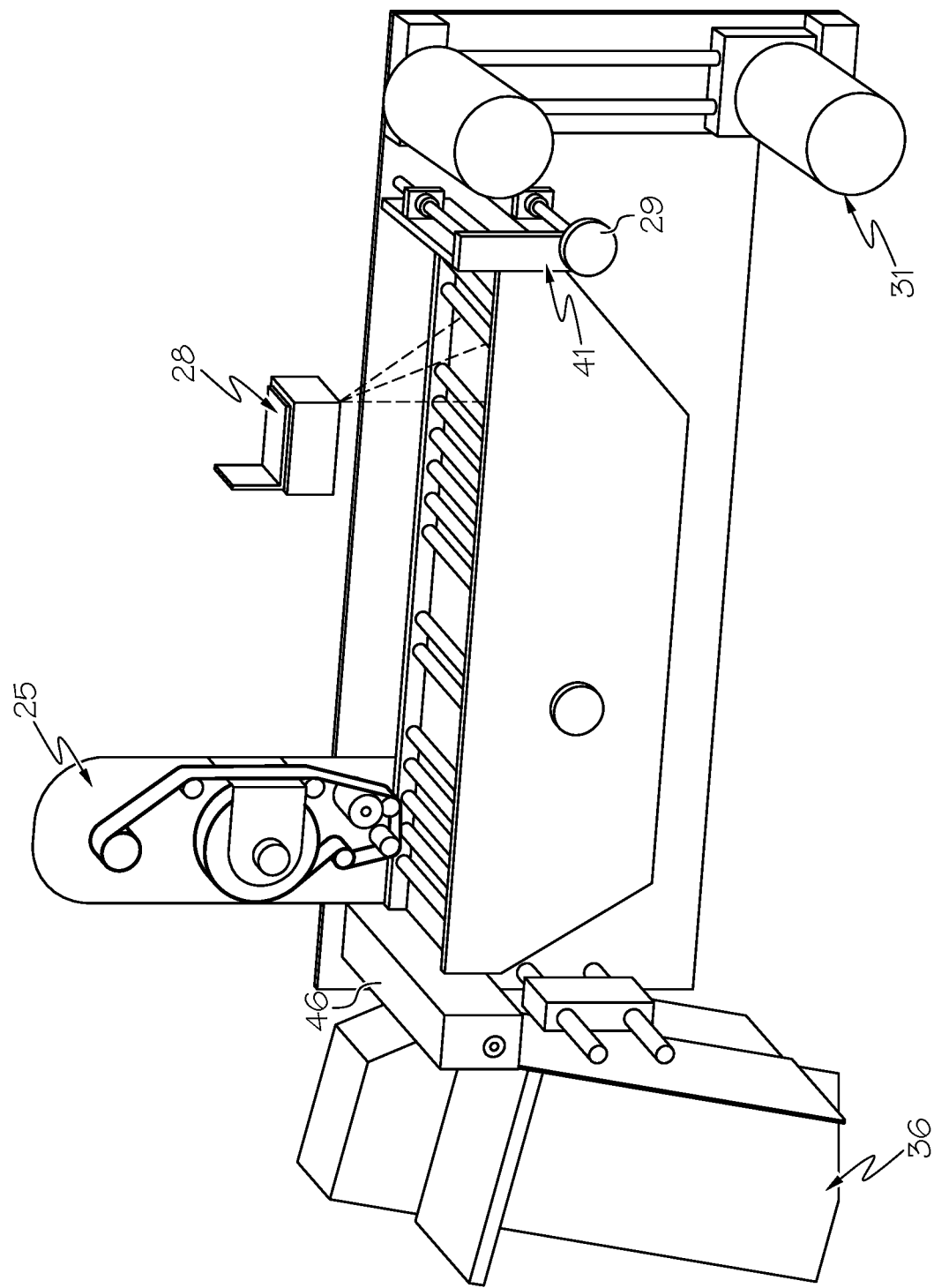
FIG. 8 is a front right perspective view of a unit as in FIG. 2C.

FIG. 7, FIG. 7A, FIG. 7B, and FIG. 8 illustrate rotary cutter embodiments of the cutting module. A rotary cutter embodiment 46 is shown in FIG. 7 without a stacker module added downstream, the rotary cutter having been installed onto the frame of the base unit or machine via a pin and securing element such as a screw, bolt, clip, for example, typically in conjunction with plugging into the base unit or machine for coordination of its function in the in-line system. Such plug-in function, as with other plug-in details mentioned herein, can be replaced with a wireless arrangement. FIG. 8 illustrates this embodiment with a stacker module 36 positioned for receiving cut tags from the rotary cutter module 46. The illustrated embodiment of this rotary cutter module includes a stand-alone rotary knife assembly 51, a knife drive shaft 52, a cutter motor 53, a finisher nip assembly 54, a nip idler gear 55, and a knife-home sensor 56. The rotary knife assembly 51 illustrated includes a stationary knife assembly 57, a rotary blade 58, a knife bridge blade 59, and bearings 60. These details illustrate components found in this embodiment, and other components could be found in other rotary cutter embodiments.

FIG. 8 shows the embodiment of an agnostic in-line verification system and method to produce finished and verified RFID-enabled tags, labels, tickets, stickers and other RFID-enabled items in need of accurate, convenient and rapid verification of criteria and parameters required of such items, while rejecting items that do not pass the verification analyses of the system and method.

D. Processing RFID-Enabled Cut Single Tags Flow

Figure 10:
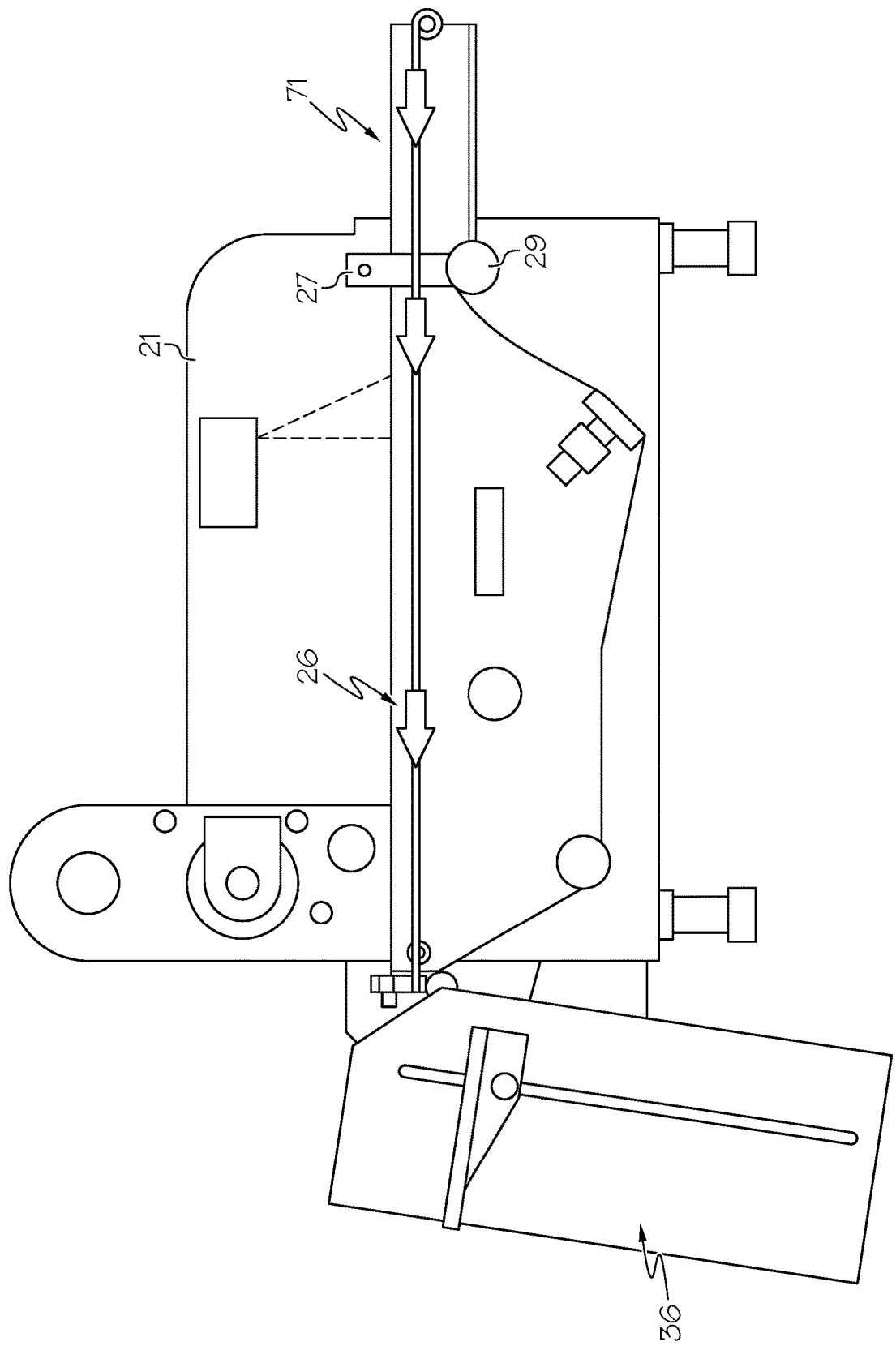
FIG. 10 is an elevation conceptual view of an arrangement of an agnostic in-line verification system of the type schematically illustrated in FIG. 3B.

FIG. 10 somewhat conceptually presents an arrangement of an agnostic in-line verification system such as schematically shown in FIGS. 3A and 3B. A registration sensor embodiment 41 of sensor 27 is located along an initial portion of the base unit or machine, for example at the feed end of the base unit or machine 21, at the feed end of main conveyor 26 or otherwise positioned downstream of the feed module in this embodiment, generally designated at 71. The registration sensor 41 determines whether a specific tag flowing along the feed module 71 is in proper relationship to the rest of the agnostic in-line verification system or other tags being advanced by the finishing device.

Figure 11:
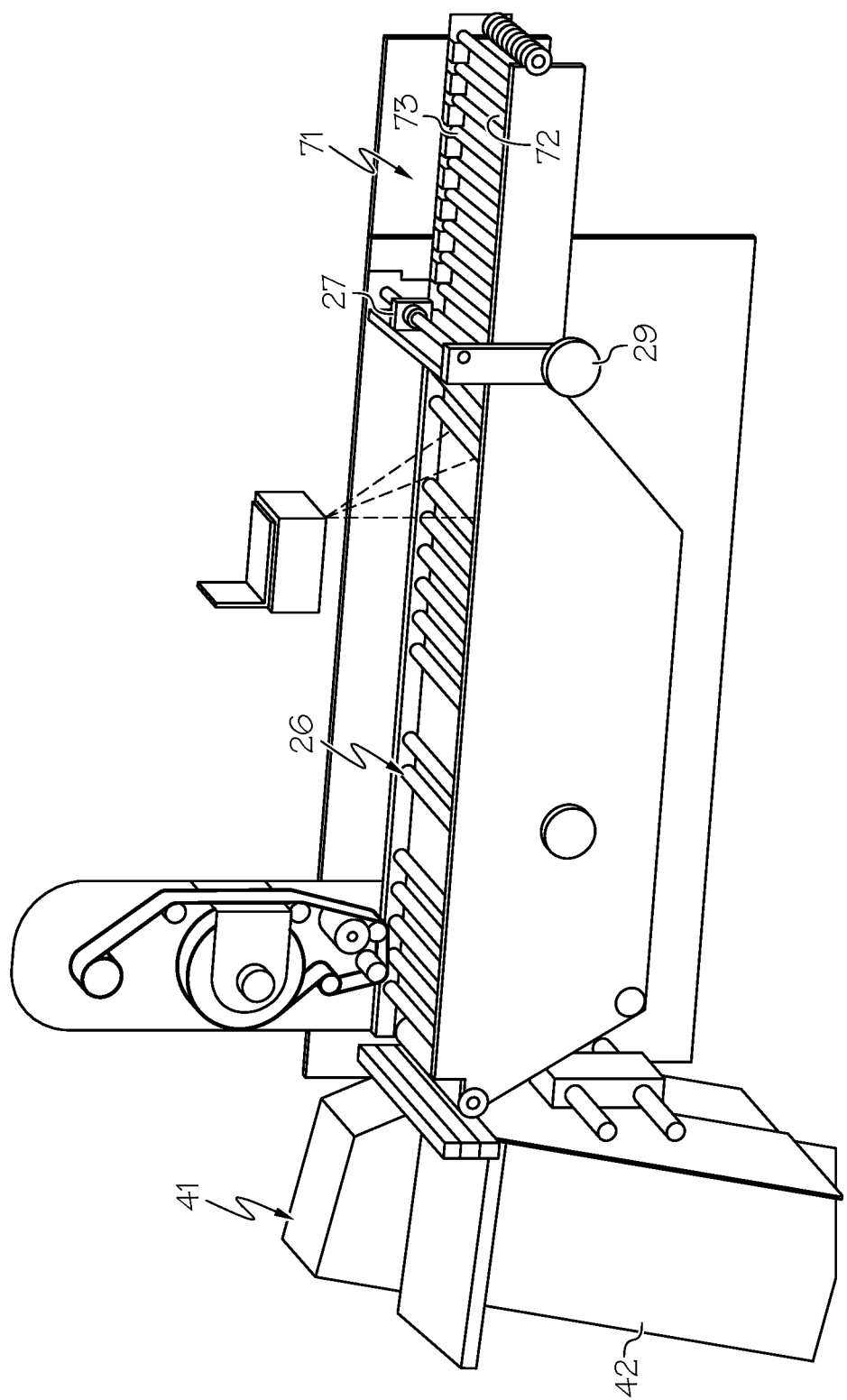
FIG. 11 is a right perspective view of an agnostic in-line verification system as in FIG. 3B.

The feed module 71 illustrated in this embodiment of FIG. 10 and FIG. 11 comprises an auxiliary conveyor 72 having components illustrated in FIG. 12. Components of FIG. 12 include a plurality of rollers 73 of the auxiliary conveyor, a driving gear 74, an idler roller 75, a drive roller 76, and a plurality of bearings 77. These components illustrate a particular embodiment of the feed module and alternative details and parts are contemplated.

This FIG. 10 embodiment typically includes the stacker module 36 that collects the finished, printed/encoded tags. The stacker module is adjustable to accommodate a variety of tag types and short or long tags or labels. In this embodiment, a stacker platform 42 moves downwardly as tags accumulate. When desired, a sensor will be tripped when the stacker is full to signal the agnostic in-line verification system to stop providing an opportunity to remove the stack of tags or labels from the stacker module.

Figure 13:
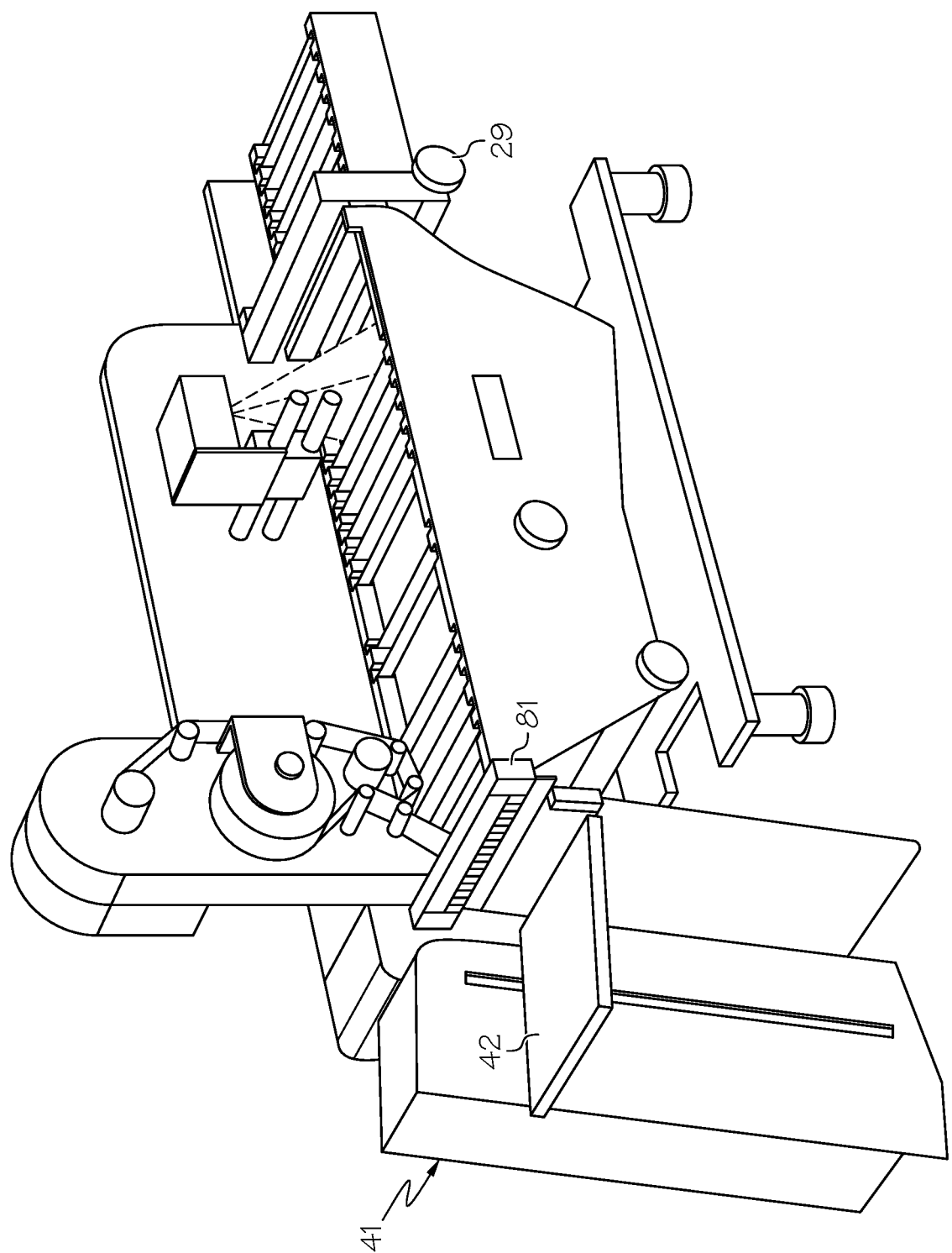
FIG. 13 is a left perspective view of an agnostic in-line verification system as in FIG. 3B, illustrating a cut single option embodiment.

To accommodate orderly transfer from the main conveyor of the base unit or machine of this embodiment, a transfer nip module generally designated at 81 can be provided, an embodiment of a transfer nip module being illustrated in FIG. 13, FIG. 13A and FIG. 14. This embodiment comprises a finisher nip assembly 82 embodiment, in this case including a nip roller, a static brush, a nip drive roller, a nip stripper and a jam sensor. Also illustrated in FIG. 14 are a nip feed motor 83, a nip gear 84 and a nip signal assembly 85.

E. Overall System Operation

Figure 16:
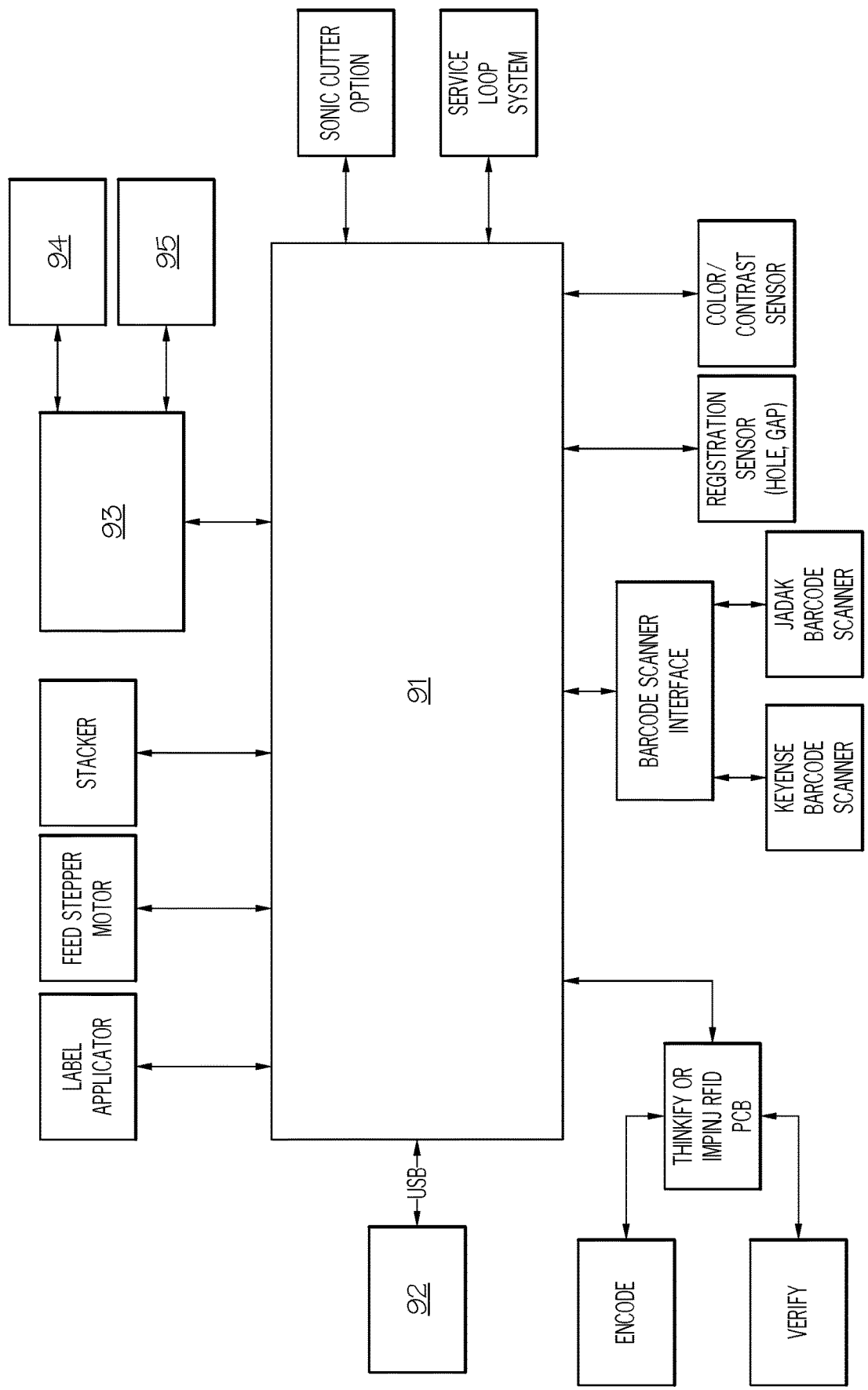
FIG. 16 is an electrical block diagram illustration embodiment of the agnostic in-line verification system.

FIG. 16 provides an embodiment in the form of a block schematic or electrical block diagram illustrating the overall system of the agnostic in-line verification system to produce finished and verified RFID-enabled tags. A finisher main printed circuit board (PCB) 91 such as for a Thinkify or Impinj reader is illustrated along with its operational and interactive communication with various components of the overall system. Various versions and options are illustrated, including communication with an external processor or computer 92, which can be a personal computer of the user or other remote data system which can be at a central location serving in a hub and spoke configuration. Also shown is an interface 93 for the options of a linear cutter module 94 or a rotary cutter module 94, as examples of choices for cutter modules.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An agnostic in-line verification system to produce finished RFID-enabled tags including labels, tags, tickets, stickers and the like, the system comprising:
   an RFID-verification base unit comprising an RFID-verifier that confirms verification of programmed data of the RFID-enabled tags;
   a feed module upstream of the RFID-verification base that receives from a source of RFID-enabled tags a flow of RFID-enabled tags to be finished through RFID verification; and
   a collector module disposed downstream of the RFID-verification base unit and that receives RFID-verified tags from the RFID-verification base unit, wherein the collector module comprises a stacker configured to move downwards for accumulating the RFID-verified tags.

2. The system in accordance with claim 1, further including a cutter module downstream of the RFID-verification base unit and upstream of the collector module, the cutter module separating RFID-verified tags from the RFID-verification base unit.

3. The system in accordance with claim 1, wherein the feed module includes a roll-to-roll service loop that presents the RFID-enabled tags to the RFID-verification base unit in order to accommodate movement of the RFID-enabled tags through the RFID-verification base unit.

4. The system in accordance with claim 1, wherein the feed module includes a leading pre-feed conveyor that presents the RFID-enabled tags to the RFID-verification base unit.

5. The system in accordance with claim 1, wherein a single-feed nip is positioned between the RFID verification base unit and the collector module.

6. The system in accordance with claim 2, wherein the cutter module includes a rotary cutter.

7. The system in accordance with claim 2, wherein the cutter module includes a linear cutter.

8. The system in accordance with claim 2, wherein the cutter module includes a double cutter that severs the RFID tags at two locations thereon.

9. The system in accordance with claim 1, wherein the RFID-verification base unit includes a scanner for reading identification indicia of the RFID-tags, an RFID verifier, and a bad-label marking applicator.

10. The system in accordance with claim 9, wherein the identification indicia is a barcode-type of indicia.

11. The system in accordance with claim 9, wherein the RFID-verification base further includes a registration sensor at an interface between the feed module and the RFID-verification based unit.

12. The system in accordance with claim 1, wherein the RFID-enabled tags are pre-printed on a printer upstream of and in-line with the feed module.

13. An agnostic in-line verification system to produce finished RFID-enabled tags including labels, tags, tickets, stickers and the like, the system comprising:
    an RFID-verification base unit that includes an RFID-verifier that checks for verification of programmed data of the RFID-enabled tags;
    a feed module upstream of the RFID-verification base that receives from a source of RFID-enabled tags a flow of RFID-enabled tags to be finished through RFID verification, the feed module including a roll-to-roll service loop that presents the RFID-enabled tags to the RFID-verification base unit allowing for accumulation of RFID-enabled tags in order to accommodate movement of the RFID-enabled tags through the RFID-verification base unit;
    a cutter module downstream of the RFID-verification bae unit and upstream of the collector module, the cutter module separating RFID-verified tags from the RFID-verification base unit; and
    a collector module downstream of the RFID-verification base unit and that receives RFID-verified tags from the RFID-verification base unit, wherein the collector module comprises a stacker configured to move downwards for accumulating the RFID-verified tags.

14. The system in accordance with claim 13, wherein the cutter module is selected from the group consisting of a linear cutter, a double cutter that severs the RFID tags at two locations thereon, and a rotary cutter.

15. The system in accordance with claim 14, wherein the RFID-verification base unit includes a scanner for reading identification indicia of the RFID-tags, an RFID verifier, and a bad-label marking applicator.

16. The system in accordance with claim 15, wherein the RFID-verification base further includes a registration sensor at an interface between the feed module and the RFID-verification based unit.

17. An agnostic in-line verification system to produce finished RFID-enabled tags including labels, tags, tickets, stickers and the like, the system comprising:
    an RFID-verification base unit that includes an RFID-verifier that checks for verification of programmed data of the RFID-enabled tags;
    a feed module upstream of the RFID-verification base that receives from a source of RFID-enabled tags a flow of RFID-enabled tags to be finished through RFID verification, the feed module including a leading pre-feed conveyor that presents the RFID-enabled tags to the RFID-verification base unit;

a collector module downstream of the RFID-verification base unit and that receives RFID-verified tags from the RFID-verification base unit, wherein the collector module comprises a stacker configured to move downwards for accumulating the RFID-verified tags; and a single-feed nip is positioned between the RFID verification base unit and the collector module.

18. The system in accordance with claim 17, wherein the RFID-verification base unit includes a scanner for reading identification indicia of the RFID-tags, an RFID verifier, and a bad-label marking applicator.

19. The system in accordance with claim 17, wherein the RFID-verification base further includes a registration sensor at an interface between the feed module and the RFID-verification based unit.

20. The system in accordance with claim 17, wherein the RFID-enabled tags are pre-printed on a printer upstream of and in-line with the feed module.

21. The system in accordance with claim 4, wherein a single-feed nip is positioned between the RFID verification base unit and the collector module.

\* \* \* \* \*